US008768819B2

(12) United States Patent
Lutnick et al.

(10) Patent No.: US 8,768,819 B2
(45) Date of Patent: Jul. 1, 2014

(54) MULTICOMPUTER DISTRIBUTED PROCESSING OF LARGE BLOCK TRADING DATA

(75) Inventors: Howard W. Lutnick, New York, NY (US); Dean P. Alderucci, New York, NY (US); Mark Miller, New York, NY (US); Andrew Fishkind, New York, NY (US); Kevin Foley, New York, NY (US); Bill Rice, Los Angeles, CA (US); Brian L. Gay, New York, NY (US); Philip Marber, New York, NY (US); Charles Plott, Pasadena, CA (US)

(73) Assignee: CFPH, LLC, New York, NY (US)

( * ) Notice: Subject to any disclaimer, the term of this patent is extended or adjusted under 35 U.S.C. 154(b) by 725 days.

(21) Appl. No.: 12/271,027

(22) Filed: Nov. 14, 2008

(65) Prior Publication Data
US 2009/0204535 A1 Aug. 13, 2009

Related U.S. Application Data

(60) Provisional application No. 60/988,426, filed on Nov. 15, 2007.

(51) Int. Cl.
*G06Q 40/00* (2012.01)
*G06Q 40/04* (2012.01)
*G06Q 40/06* (2012.01)

(52) U.S. Cl.
USPC ............... 705/37; 705/36 R; 705/38; 705/35; 705/14.1; 712/12; 707/999.104

(58) Field of Classification Search
USPC .......... 705/14.1, 35–38; 712/12; 707/999.104
See application file for complete search history.

(56) References Cited

U.S. PATENT DOCUMENTS

| 5,126,936 A | 6/1992 | Champion et al. |
| 5,799,287 A | 8/1998 | Dembo |
| 5,924,082 A | 7/1999 | Silverman et al. |

(Continued)

FOREIGN PATENT DOCUMENTS

| CA | 2624097 | 9/2006 |
| EP | 2220846 | 10/2012 |

(Continued)

OTHER PUBLICATIONS

PCT Search Report and Written Opinion for PCT/US07/68900; 6 pages; Jan. 29, 2008.

(Continued)

*Primary Examiner* — Harish T Dass

(57) ABSTRACT

Systems and methods for administering trade orders are described. An embodiment comprises receiving, from a first server operated by a first trader, a communication including a first trade order and one or more selection criteria, the first trade order including at least one of a specified instrument, a specified quantity, and a specified price; determining that a database of trade orders does not contain a trade order matching the first trade order; identifying a plurality of traders satisfying the selection criteria; sending, to a plurality of second servers, a query including at least one of the specified instrument, the specified quantity, and the specified price; receiving, from a one of the plurality of second servers operated on behalf of a second trader, a positive response to the query; and facilitating execution of a trade between the first trader and the second trader for the specified instrument at the specified price.

84 Claims, 5 Drawing Sheets

(56) References Cited

U.S. PATENT DOCUMENTS

| | | | |
|---|---|---|---|
| 6,012,046 A | 1/2000 | Lupien et al. | |
| 6,408,282 B1 | 6/2002 | Buist | |
| 6,938,010 B1 | 8/2005 | Everson et al. | |
| 6,952,683 B1 | 10/2005 | Gerhard | |
| 7,136,834 B1 | 11/2006 | Merrin et al. | |
| 7,155,409 B1 | 12/2006 | Stroh | |
| 7,308,428 B1 | 12/2007 | Federspiel | |
| 7,356,500 B1 | 4/2008 | Waelbroeck et al. | |
| 7,418,416 B2 | 8/2008 | Guidi et al. | |
| 7,428,506 B2* | 9/2008 | Waelbroeck et al. | 705/37 |
| 7,475,046 B1 | 1/2009 | Foley et al. | |
| 7,565,313 B2 | 7/2009 | Waelbroeck et al. | |
| 7,680,715 B2 | 3/2010 | Waelbroeck et al. | |
| 7,685,052 B2 | 3/2010 | Waelbroeck et al. | |
| 7,747,515 B1 | 6/2010 | Merrin et al. | |
| 7,778,919 B2 | 8/2010 | Waelbroeck et al. | |
| 7,814,000 B2 | 10/2010 | Waelbroeck et al. | |
| 7,827,085 B1 | 11/2010 | Hochenberger et al. | |
| 7,865,425 B2 | 1/2011 | Waelbroeck et al. | |
| 7,877,318 B2 | 1/2011 | Waelbroeck et al. | |
| 7,882,015 B2 | 2/2011 | Waelbroeck et al. | |
| 7,908,205 B2 | 3/2011 | Waelbroeck et al. | |
| 7,908,206 B2 | 3/2011 | Waelbroeck et al. | |
| 7,917,425 B2 | 3/2011 | Waelbroeck et al. | |
| 7,996,261 B1 | 8/2011 | Waelbroeck et al. | |
| 8,010,438 B2 | 8/2011 | Waelbroeck et al. | |
| 8,041,628 B2 | 10/2011 | Waelbroeck et al. | |
| 8,069,106 B2 | 11/2011 | Waelbroeck et al. | |
| 8,073,763 B1 | 12/2011 | Merrin et al. | |
| 8,082,205 B2 | 12/2011 | Lutnick et al. | |
| 8,095,456 B2 | 1/2012 | Waelbroeck et al. | |
| 8,103,579 B1 | 1/2012 | Berkeley, III | |
| 8,165,954 B2 | 4/2012 | Waelbroeck et al. | |
| 8,266,045 B2 | 9/2012 | Waelbroeck et al. | |
| 8,285,629 B2 | 10/2012 | Lutnick et al. | |
| 8,306,904 B1 | 11/2012 | Marchini | |
| 8,311,920 B2 | 11/2012 | Lutnick et al. | |
| 8,321,323 B2 | 11/2012 | Lutnick et al. | |
| 8,447,649 B1 | 5/2013 | Waelbroeck et al. | |
| 2001/0050990 A1 | 12/2001 | Sudia | |
| 2002/0032668 A1 | 3/2002 | Kohler et al. | |
| 2002/0052827 A1 | 5/2002 | Waelbroeck et al. | |
| 2002/0099642 A1 | 7/2002 | Schwankl et al. | |
| 2002/0104002 A1 | 8/2002 | Nishizawa et al. | |
| 2003/0004859 A1 | 1/2003 | Shaw et al. | |
| 2003/0009427 A1 | 1/2003 | Pan | |
| 2003/0182214 A1 | 9/2003 | Taylor | |
| 2003/0182224 A1 | 9/2003 | Horrigan et al. | |
| 2004/0034591 A1* | 2/2004 | Waelbroeck et al. | 705/37 |
| 2004/0059666 A1 | 3/2004 | Waelbroeck et al. | |
| 2004/0133495 A1 | 7/2004 | Bosch et al. | |
| 2004/0177023 A1 | 9/2004 | Krowas et al. | |
| 2004/0210511 A1 | 10/2004 | Waelbroeck et al. | |
| 2005/0075963 A1 | 4/2005 | Balabon | |
| 2005/0149428 A1 | 7/2005 | Gooch et al. | |
| 2005/0166046 A1 | 7/2005 | Bellowin et al. | |
| 2005/0187866 A1 | 8/2005 | Lee | |
| 2005/0273421 A1 | 12/2005 | Rosenthal et al. | |
| 2006/0031156 A1 | 2/2006 | Noviello et al. | |
| 2006/0129477 A1 | 6/2006 | Goodwin et al. | |
| 2006/0136318 A1 | 6/2006 | Rafieyan et al. | |
| 2006/0136326 A1 | 6/2006 | Heckman et al. | |
| 2006/0143099 A1 | 6/2006 | Partlow et al. | |
| 2006/0259394 A1 | 11/2006 | Cushing et al. | |
| 2007/0005484 A1 | 1/2007 | Waelbroeck et al. | |
| 2007/0005488 A1 | 1/2007 | Keith | |
| 2007/0038548 A1 | 2/2007 | Schlifstein et al. | |
| 2007/0083452 A1 | 4/2007 | Mayle et al. | |
| 2007/0124228 A1 | 5/2007 | Elias et al. | |
| 2007/0150405 A1 | 6/2007 | Greenberg et al. | |
| 2007/0192227 A1 | 8/2007 | Fitzpatrick et al. | |
| 2007/0244790 A1 | 10/2007 | Olsson et al. | |
| 2007/0244792 A1 | 10/2007 | Couperier | |
| 2007/0288342 A1 | 12/2007 | Maclin et al. | |
| 2008/0021803 A1 | 1/2008 | Ahles et al. | |
| 2008/0027847 A1 | 1/2008 | Masucci | |
| 2008/0033867 A1 | 2/2008 | Hirani et al. | |
| 2008/0040257 A1 | 2/2008 | Nafeh et al. | |
| 2008/0262957 A1 | 10/2008 | Ford | |
| 2008/0294544 A1 | 11/2008 | Harrington et al. | |
| 2009/0018945 A1 | 1/2009 | Ford | |
| 2009/0094151 A1 | 4/2009 | Mortimer | |
| 2009/0259584 A1 | 10/2009 | Waelbroeck et al. | |
| 2009/0307121 A1 | 12/2009 | Lutnick et al. | |
| 2009/0313169 A1 | 12/2009 | Foley et al. | |
| 2009/0319417 A1 | 12/2009 | Littlewood | |
| 2010/0057626 A1 | 3/2010 | Lutnick et al. | |
| 2010/0057627 A1 | 3/2010 | Lutnick et al. | |
| 2010/0076883 A1 | 3/2010 | Lutnick et al. | |
| 2010/0076884 A1 | 3/2010 | Lutnick et al. | |
| 2010/0076896 A1 | 3/2010 | Lutnick et al. | |
| 2010/0082495 A1 | 4/2010 | Lutnick et al. | |
| 2010/0082500 A1 | 4/2010 | Lutnick et al. | |
| 2010/0121759 A1 | 5/2010 | Waelbroeck et al. | |
| 2010/0153304 A1 | 6/2010 | Waelbroeck et al. | |
| 2010/0191637 A1 | 7/2010 | Alderucci et al. | |
| 2010/0191638 A1 | 7/2010 | Alderucci et al. | |
| 2010/0332368 A1 | 12/2010 | Alderucci et al. | |
| 2011/0137785 A1 | 6/2011 | Lutnick et al. | |
| 2011/0137786 A1 | 6/2011 | Lutnick et al. | |
| 2012/0095901 A1 | 4/2012 | Berkeley, III | |
| 2013/0097065 A1 | 4/2013 | Lutnick et al. | |
| 2013/0218740 A1 | 8/2013 | Lutnick et al. | |

FOREIGN PATENT DOCUMENTS

| | | |
|---|---|---|
| JP | H10-504409 | 4/1998 |
| JP | 2001-229302 | 8/2001 |
| JP | 2002-297606 | 10/2002 |
| JP | 2004-127113 | 4/2004 |
| JP | 2005-228029 | 8/2005 |
| JP | 2008-518362 | 5/2008 |
| JP | 2009-534744 | 9/2009 |
| JP | 2001-319064 | 11/2011 |
| WO | WO 96/05563 | 2/1996 |
| WO | WO 2006/047712 | 5/2006 |
| WO | WO 2007/127041 | 11/2007 |

OTHER PUBLICATIONS

Examiners Report for AU Application No. 2007149195; Dec. 15, 2009; 2 pages.
PCT Search Report and Written Opinion for PCT/US08/83618; Apr. 22, 2009; 12 pages.
PCT Search Report and Written Opinion for PCT/US08/83571; Mar. 26, 2009; 15 pages.
U.S. Appl. No. 12/300,766, filed May 14, 2007; 30 Pages.
U.S. Appl. No. 12/015,990, filed Jan 17, 2008; 80 Pages.
U.S. Appl. No. 12/470,431, filed May 21, 2008; 92 Pages.
U.S. Appl. No. 12/477,523, filed Jun. 3, 2009; 92 Pages.
U.S. Appl. No. 12/477,549, filed Jun. 3, 2009; 92 Pages.
U.S. Appl. No. 12/204,403, filed Sep. 4, 2008; 170 Pages.
U.S. Appl. No. 12/237,941, filed Sep. 25, 2008; 185 Pages.
U.S. Appl. No. 12/237,958, filed Sep. 25, 2008; 176 Pages.
U.S. Appl. No. 12/237,976, filed Sep. 25, 2008; 177 Pages.
U.S. Appl. No. 12/204,341, filed Sep. 4, 2008; 163 Pages.
U.S. Appl. No. 12/135,479, filed Jun. 9, 2008; 75 Pages.
U.S. Appl. No. 12/239,803, filed Sep. 28, 2008; 114 Pages.
AU Examination Report for AU Application No. 2008322494 dated Mar. 4, 2011; 2 pages.
U.S. Appl. No. 12/494,438 dated Apr. 1, 2011; 12 pages.
U.S. Appl. No. 12/239,804, filed Sep. 28, 2008; 114 Pages.
U.S. Appl. No. 12/257,499, filed Oct. 24, 2008; 169 Pages.
U.S. Appl. No. 12/358,753, filed Jan. 23, 2009; 163 Pages.
U.S. Appl. No. 12/494,438, filed Jun. 30, 2009; 169 Pages.
U.S. Appl. No. 12/631,181, filed Dec. 4, 2009; 169 Pages.
AU Examination Report for AU Application No. 2008322557 dated Mar. 4, 2011; 2 pages.
Notice of Acceptance for AU Application No. 2007249195; Apr. 7, 2010; 6 pages.

(56) References Cited

OTHER PUBLICATIONS

PCT International Search Report and Written Opinion for Application No. PCT/US10/21986 filed Jan. 25, 2010; 8 pages.
Schmerken, Ivy; "Credit Suisse Introduces Block Algos to Tap Liquidity in CrossFinder ATS and Other Venues Simultaneously"; Advanced Trading; Mar. 18, 2010; 2 pages.
Harris, Larry; "Trading & Exchanges, Market Microstructure for Practitioners"; 2003; 7 pages.
"Official Launch of New York Block exchange announced"; Automated Trading News; Jan. 30, 2009; 1 page.
US PTO Office Action for U.S. Appl. No. 12/204,341 dated Oct. 26, 2010; 31 pages.
U.S. Appl. No. 60/820,053, filed Jul. 21, 2006; 28 pages.
U.S. Appl. No. 60/825,504, filed Sep. 13, 2006; 28 pages.
U.S. Appl. No. 60/799,897, filed May 13, 2006; 24 pages.
U.S. Appl. No. 60/988,010, filed Nov. 14, 2007; 67 pages.
U.S. PTO Office Action for U.S. Appl. No. 12/015,990; Jan. 3, 2011; 3 pages.
U.S. Appl. No. 60/988,426, filed Nov. 15, 2007; 177 pages.
U.S. Appl. No. 61/306,516, filed Feb. 21, 2010; 172 pages.
U.S. PTO Office Action for U.S. Appl. No. 12/015,990; Apr. 27, 2010; 11 pages.
U.S. Appl. No. 12/631,208, filed Dec. 4, 2009; 167 Pages.
U.S. Appl. No. 12/358,768, filed Jan. 23, 2009; 165 Pages.
AU Examiners Report for Application No. 2006204096 dated May 3, 2011; 2 pages.
JP Office Action for Application No. 2009-511195; Apr. 10, 2012; 4 pages (including English Translation).
CA Office Action for Application No. 2652285; Mar. 30, 2012; 3 pages.
Notice of Allowance for U.S. Appl. No. 12/015,990; 12 pages; May 11, 2012.
AU Notice of Acceptance for Application No. 2010202272 dated Dec. 1, 2012; 2 pages.
U.S. PTO Office Action for U.S. Appl. No. 12/300,766; 21 pages; Dec. 12, 2012.
Microsoft Computer Dictionary 5th Edition.
EP Extended Search Report for Application No. 08849948.8, 5 pages; Apr. 25, 2012.
Statement in accordance with Notice from EPO dated Oct. 1, 2007.
EP Extended Search Report for Application No. 08848638.6, 5 pages; Apr. 25, 2012.
JP Notice of Allowance for Application No. 2009-511195, 4 pages; Jan. 30, 2013 (w/English translation).
CA Examiner's Requisition for Application No. 2,705,945, 2 pages; Jan. 18, 2013.
JP Office Action for Application No. 2010-534209, 4 pages; Apr. 23, 2013 (w/English translation).
JP Office Action for Application No. 2010-534209, 4 pages; Oct. 15, 2013 (w/English translation).
U.S. Notice of Allowance for U.S. Appl. No. 12/113,602; Aug. 19, 2011; 14 pages.
U.S. PTO Office Action for U.S. Appl. No. 13/613,862; 18 pages; Mar. 4, 2013.
U.S. PTO Office Action for U.S. Appl. No. 13/614,758; 18 pages; Aug. 16, 2013.
U.S. PTO Office Action for U.S. Appl. No. 12/300,766; 11 pages; Sep. 19, 2013.
JP Office Action for Application No. 2013-041263, 7 pages; Dec. 3, 2013 (w/English translation).
U.S. PTO Office Action for U.S. Appl. No. 13/613,862; 18 pages; Oct. 17, 2013.
CA Examiner's Requisition for Application No. 2,705,940, 2 pages; Jun. 11, 2013.

\* cited by examiner

MULTICOMPUTER DISTRIBUTED PROCESSING OF LARGE BLOCK TRADING DATA

CROSS-REFERENCE TO RELATED APPLICATIONS

This application claims priority to U.S. Provisional Application Ser. No. 60/988,426 filed Nov. 15, 2007, entitled "Trading System Products and Processes."

BRIEF DESCRIPTION OF THE DRAWINGS

The accompanying drawings are not intended to be drawn to scale. In the drawings, each identical or similar component that is illustrated in various figures is represented by a like numeral. For purposes of clarity, not every component may be labeled or act identified in every drawing. In the drawings.

DETAILED DESCRIPTION

Figure 1:
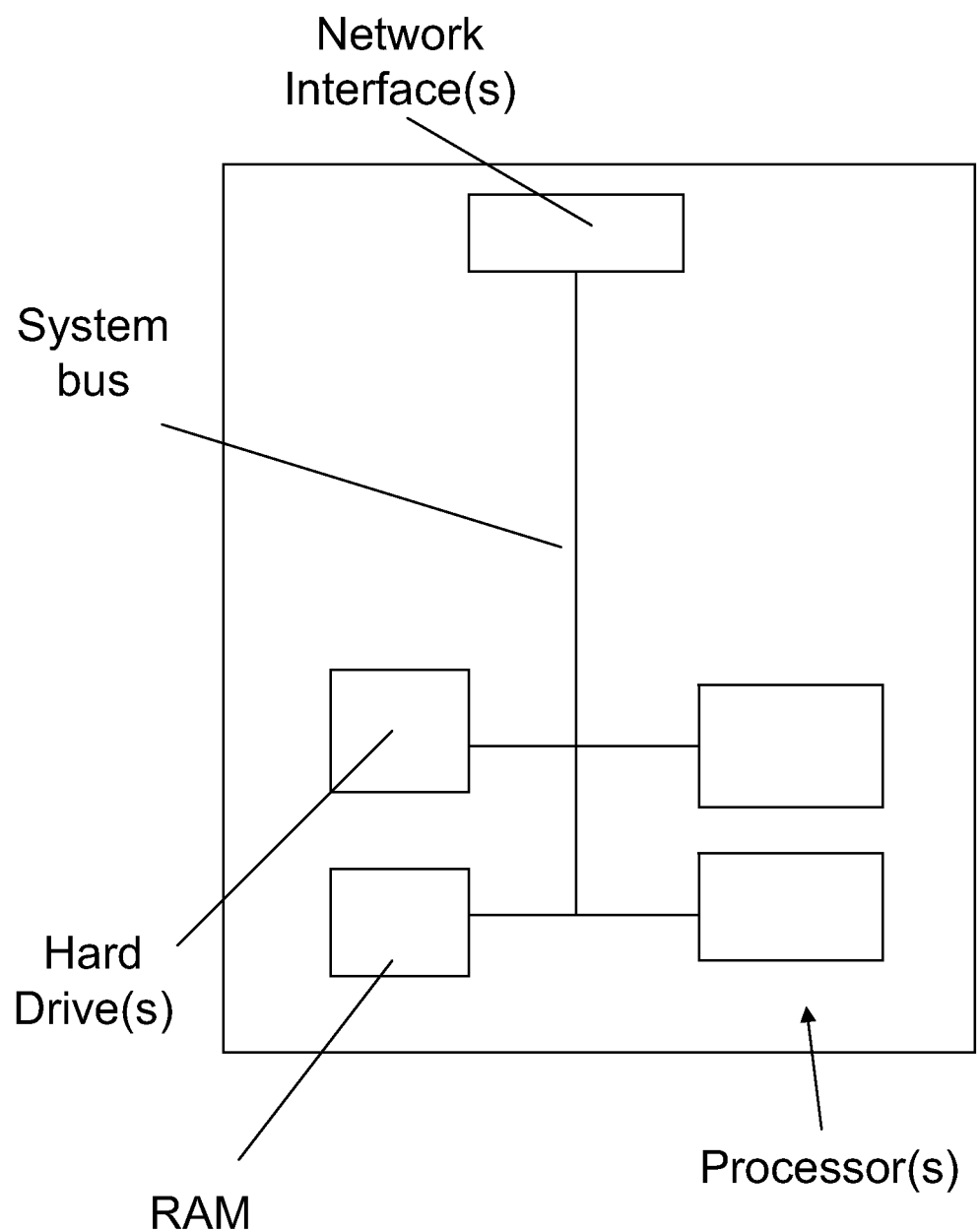
FIG. 1 shows a computer system architecture that may be used to perform one or more acts in accordance with some embodiments.

Traders of financial instruments sometimes dislike revealing information to the market about instruments they are interested in purchasing or selling. This is particularly so for large transactions, where a release of information that some entity is interested in arranging a large volume transaction for an instrument can affect the market for that instrument even before any transaction occurs. If traders are hesitant to post large orders, liquidity in the market is hindered.

Systems and methods are described herein for administering trade orders and arranging for traders to find partners to trade with. One advantage of some embodiments of systems and methods described herein is that they can keep more information confidential, and keep it confidential for longer, than conventional systems.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term "process" or a like term. Accordingly, any reference in a claim to a "step" or "steps" of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment", "further embodiments" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "a further embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

The phrase "facilitates execution of a trade" means "performs whatever function is necessary for a trade to be completed." For example, "facilitating execution of a trade" may include sending data to an appropriate clearinghouse so that a trade may be executed between two entities for a specified instrument at a specified price (e.g. without further opportunity for negotiation).

The phrase "in communication with" means "able to transmit data to and/or receive data from." For example, a first server "in communication with" a second server may be connected to the second server via a network such as the internet. A server can "communicate" with another server if it is "in communication with" the other server.

The term "instrument" means any financial instrument traded in any market. For example, an "instrument" may include a security, a stock certificate, a bond, a future, an option, a forward, a call, a put, a swap, a collar, a currency contract, and/or others.

The term "key" means "any segment of data, such as packets, strings, etc., that can be interpreted by a receiving server to indicate whether a response from that server is desired or would be discarded."

The phrase "market price" means "a price in the market for a particular instrument at which the instrument can be bought or sold." The phrase "market price" may refer to a market price at the time an offer is made, at the time an offer is accepted, at the time the trade is cleared, at market close or market open on the day an offer is made or accepted, or a market price at any other time. The meaning of the phrase "market price" may also include a market midpoint price at the time an offer is made, at the time an offer is accepted, at the time the trade is cleared, at market close or market open on the day an offer is made or accepted, or at any other time. A market midpoint price is a price that is exactly between the best current buy price and best current sell price on the market.

The phrase "matching trade order" means "a second trade order that shares enough parameters with a first trade order that a trade can be formed trading one against the other." A matching trade order may only partially fill the trade order against which the trade is formed. For example, if the first trade order offers to buy 10,000 shares of Microsoft stock at $50 per share, a second trade order offering to sell 5,000 shares of Microsoft stock at the same price may be a matching trade order even though it only partially fills the first trade order. Where the specified instrument, specified quantity, or specified price in the first trade order are ranges or otherwise variable (see the definitions of specified instrument, specified quantity, and specified price) a second trade order can be a matching trade order by falling within the ranges or enumerations set forth in the first trade order. For example, if the first trade order offers to buy 10,000 shares of Microsoft stock at $50 per share or less, a second trade order offering to sell 10,000 shares of Microsoft stock at $49 per share can be a matching trade order.

The phrase "order management system" means "any computer configured to execute orders for trading financial instruments, whether buy-side or sell-side; whether institutional trader or broker; a computer associated with associated with anyone participating in the market."

The phrase "open trade order" means "a trade order stored on a server, such that if the server receives information about the existence of another trade order matching the stored trade order, the server will indicate (e.g., by sending a communication) an intent to trade the stored trade order against the matching trade order."

A computer that is "operable" to present offers or enter trades on behalf of a trader may, in some embodiments, present offers or enter trades on behalf of the trader in response to receiving an input from a user. In other embodiments, a computer that is "operable" to present offers or enter trades on behalf of a trader may present offers or enter trades on behalf of the trader without receiving an input from a user.

The phrase "positive response" means "a response to a query indicating an interest to trade at the parameters (specified instrument, specified quantity, and/or specified price) provided in the query." A positive response may be a binding acceptance, e.g., when the query includes a firm offer. Where a query (or the corresponding trade order) does not specify all parameters, or where the query specifies ranges for some parameters, the positive response may include some or all of the parameters necessary to define a trade. For example, if the query includes an offer to sell up to 30,000 shares of a security, the positive response may specify an intent to buy 10,000 shares of the security.

The phrase "positive response rate" means "the percentage of queries previously received by a server to which the server gave a positive response."

The term "query" means "any data transmitted from one computer to another, e.g., a data transmission including a trade order or a portion of a trade order."

The term "selection criteria" means "any criteria by which an entity providing a trade order can specify the parameters, behaviors, preferences, or other aspects of other entities to whom the first trader is interested in transmitting an offer to trade." Selection criteria may apply to servers that may receive a query relating to a trade order, to traders with whom trades on a trade order may be made, or to any combination thereof.

The term "server" means "any computer that can be programmed to execute specified functions, such as sending, receiving, or processing data; writing information to or retrieving information from a database; determining whether data satisfy specified criteria, or similar functions."

The phrase "specified instrument" includes a specific instrument (e.g., Coca-Cola stock), or a selection of instruments however specified; such as a group of instruments (e.g., Fortune 100 stocks); an enumerated set of instruments (e.g., Coca-Cola stock or Pepsi stock; Coca-Cola stock or Microsoft derivatives); any group of instruments sharing any specified property or set of properties (e.g., airline stocks; oil futures; stocks of companies reporting earnings of $1B or more); a set of instruments whose price is correlated to the price of another specified instrument (e.g., Coca-Cola stock or any stock whose value has a correlation greater than 0.5 to the value of Coca-Cola stock); and/or any combination of the previous.

The phrase "specified price" means "any information sufficient to determine an acceptable price or range of prices at which a trader is interested in trading." A specified price may be a specific unit price (e.g., $50 per share), a minimum unit price (e.g., $50 per share or more), a maximum unit price (e.g., up to $50 per share), a range of unit prices (e.g., $49-$51 per share), and/or any combination of the previous. A specified price may be a specific bulk price (e.g., $50,000), a minimum bulk price (e.g., $50,000 or more), a maximum bulk price (e.g., up to $50,000), a range of bulk prices (e.g., $49,000-$51,000), and/or any combination of the previous. A specified price may be given in terms of a market price; e.g., a market price at the time an offer is made, at the time an offer is accepted, at the time the trade is cleared, at market close or market open on the day an offer is made or accepted, or a market price at any other time. A specified price may be a price or a range of prices defined with reference to a market price (e.g., market price plus or minus ½ point; market price or greater). A specified price may be a market midpoint price or a price specified with reference to a market midpoint price. If no specified price is provided, a trading system may default to a market price at the time the offer is made or accepted, the time the trade is cleared, or any other time. Alternatively, if no specified price is provided, a trading system may default to a market midpoint price at the time the offer is made or accepted, the time the trade is cleared, or any other time.

The phrase "specified quantity" means "any way of specifying an acceptable amount or range of amounts of an instrument for which a trader is interested in trading." A specified quantity may include a specific quantity (e.g., 10,000 shares), a minimum quantity (e.g., 5,000 shares or more), a maximum quantity (e.g., up to 10,000 shares), a range of quantities (e.g., 5,000-10,000 shares), and/or any combination of the previous. A specified quantity may also include an increment (e.g., 5,000-10,000 shares in increments of 500 shares; up to 5,000 shares in increments of 1,000 shares).

The phrase "trade order" means "any offer to buy or sell an instrument, e.g., an offer to buy or sell a specified quantity of a specified instrument at a specified price." A trade order may be a firm offer or a conditional offer.

The term "trader" means "any person or entity capable of entering transactions for the purchase or sale of securities, or any person or entity on whose behalf such transactions can be entered." A trader may be a buy-side person or entity or a sell-side person or entity. A trader may present an offer to enter a transaction which reflects the trader's intent to complete the transaction. A trader may present such an offer via a computer, including but not limited to a computer that comprises or is part of an order management system. A trader may be represented by a computer that is operable to present offers and/or enter transactions on the trader's behalf. For example, such a computer may be operable to accept binding offers and/or make offers which, if accepted, would bind the trader to the transaction. Such a computer may be operable to accept offers with or without human input.

The term "trading history" means "information (e.g. a database record) about a trader's prior trades and/or responses to queries." A trading history may include (without limitation): instruments, prices, and quantities that the trader has traded, queries (and/or associated trading parameters) to which the trader has responded positively, queries (and/or associated trading parameters) to which the trader has responded negatively, etc. A trading history may also include information selectable by categories of trades, including (without limitation) positive response rates for particular instruments, for particular types of instruments (e.g., for stocks, for shares of mutual funds), for instruments relating to a particular entity, for instruments relating to a particular industry, for instruments associated with entities having certain market capitalization (e.g., small cap, mid cap, large cap), for substitutable instruments, or any other way of defining a category of trades. A trading history may also be such information associated with a particular server rather than a particular trader; e.g., queries and associated trading parameters to which the server has provided a positive response.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Exemplary Embodiments

Various embodiments disclosed herein relate to systems and methods for facilitating trades of securities between entities by which an entity wishing to make a trade offer can do so without necessarily revealing its identity or even revealing the total amount of securities it wishes to trade. In some embodiments, for example, a first server operated on behalf of a first trader may send a trade order to a second server, the trade order including an offer to trade a specified instrument, perhaps at a specified price and specified quantity. The second server may then query one or more third servers asking whether any trader associated with the third servers is interested in the trade represented in the trade order. The query need not include all of the information in the trade order. If one of the third servers responds positively to the query, a trade is facilitated between the first trader and a second trader associated with the third server. In embodiments, the facilitated trade occurs at the parameters specified in the trade order and/or in the query, without any opportunity for further negotiation between the first trader and the second trader. Such embodiments provide the advantage of concealing certain information about the offer to trade at least until the trade is completed, helping to avoid effects on the market for the specified instruments of the placement of large orders, even before those offers are filled. This in turn encourages traders to place orders, particularly large orders, and therefore enhances liquidity in the marketplace.

Figure 2:
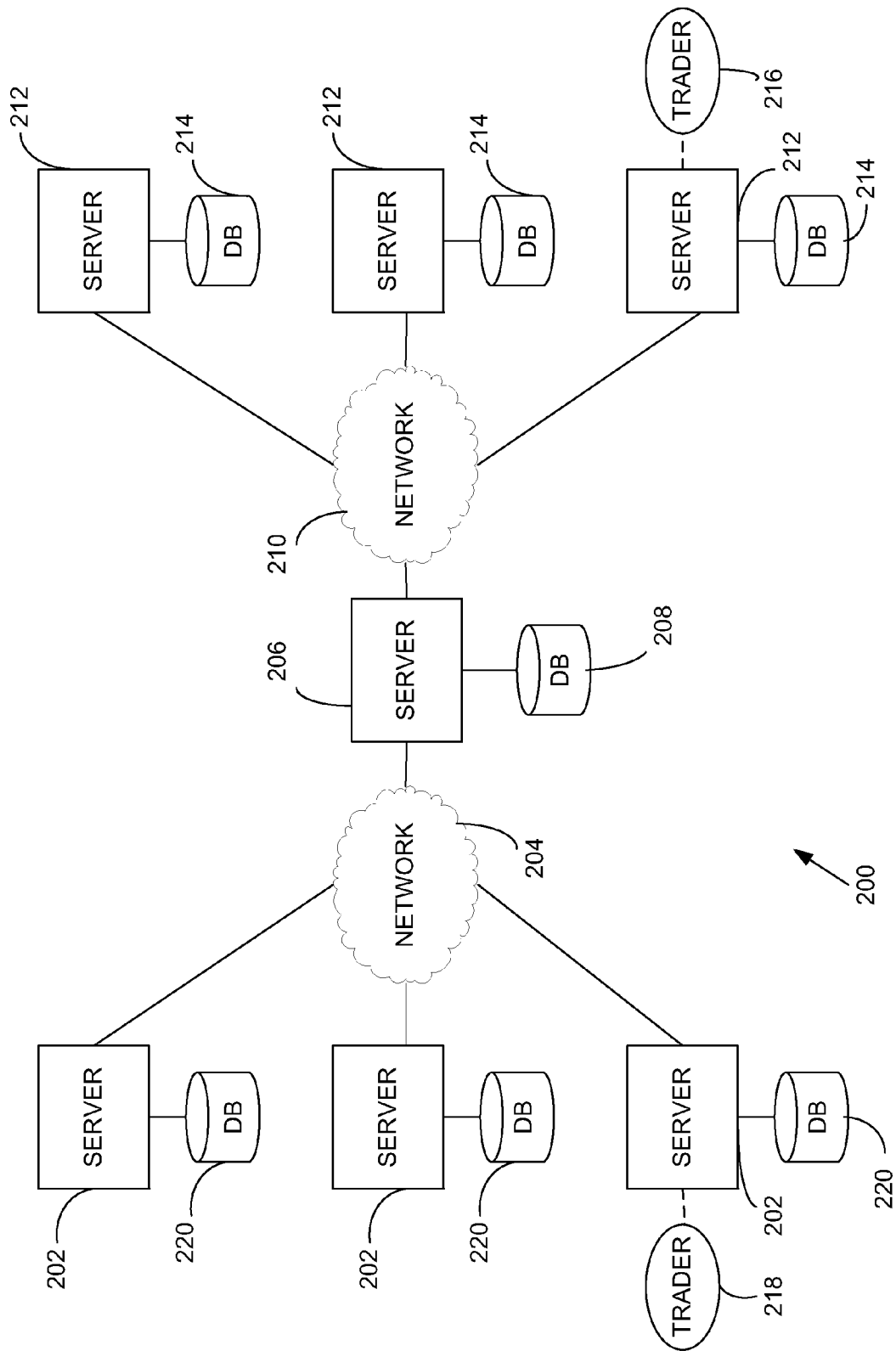
FIG. 2 shows a network of servers that may be used to perform one or more acts in accordance with the embodiments.

FIG. 2 illustrates an example configuration 200 of servers in which methods of some embodiments can be performed. Servers 202 communicate with central server 206 via network 204. Central server 206 is in communication with servers 214 via network 210. In embodiments, networks 204 and 210 may be a single network or form part of a single network. In other embodiments, networks 204 and 210 may be two separate networks unconnected except through their common connection to central server 206. In still other embodiments, networks 204 and 210 may be connected via a larger network such as the Internet.

Servers 202 may be, but are not limited to, sell-side servers. Servers 212 may be, but are not limited to, buy-side servers. A server 202 or 212 may be operated by or on behalf of one or more traders 218 or 216 (respectively). In embodiments, one or more of servers 202 and servers 212 is an order management system. Generally, servers 202 and 212 can be any server programmed to communicate with central server 206 as described below. Any of servers 202 and 212 may include or be communication with a database 220 or 214 (respectively). Database 214 may include information relating to one or more trades that a trader 216 associated with the server (for example, on whose behalf the server is operating) is interested in making. Such information may include a specified instrument that a trader is interested in buying or selling. The information may also include a specified quantity of the instrument that the trader wishes to trade. The information may also include a specified price at which the trader wishes to trade the specified instrument.

While server 206 is referred to in this discussion as a "central" server, in embodiments the functions performed by central server 206 can be performed by any suitably programmed server, including a buy-side server or a sell-side server. Central server 206 may, in embodiments, include or be in communication with database 208 of registered servers and/or registered traders that central server 206 communicates with to receive trade orders and send queries. Central server 206 may also include or be in communication with a database of trade orders that have been submitted to the central server, for example, by one of servers 202 or 212. The database of trade orders may include trade orders that have been submitted but not yet filled. The database of trade orders may be hosted together with or separately from the database of registered servers and/or registered traders.

In embodiments, a server 202 submits a trade order to the central server 206. The trade order includes an offer to trade that may be a binding offer or a conditional offer. The central server 206 may respond to receipt of the trade order by sending a query out to one or more of servers 212 as described in detail below. (Again, it should be noted that in various embodiments there may be servers that can both submit a trade order and receive a query; the order-submitting servers 202 and query-receiving servers 212 are separated here only for clarity of discussion.) A feature of some embodiments is that server 212 (or trader 218 on whose behalf server 212 operates) need not submit the trade order to any open market platform, so the trade order does not need to become publicly known. In embodiments, it is not necessary for any server other than the central server 206 to receive the identity of server 212 (or trader 218) before the offer to trade is accepted and a trade is completed.

As discussed in further detail below, the servers 212 receiving the query sent by central server 206 evaluate the query and determine whether to accept the offered trade. In embodiments, the trade may be presented to a user, who may be trader 216 or a representative of trader 216, who decides whether to accept the offered trade and inputs his decision to a terminal in communication with server 212. In other embodiments, server 212 may query the database 214 to determine whether it contains an entry for a desired trade matching the offered trade. If a positive response is indicated (either with or without human input), server 212 returns a positive response to central server 206. Central server 206 may then facilitate execution of the trade at the trade parameters (such as specified instrument, specified quantity, and/or specified price) set forth in the trade order submitted by server 202. A feature of some embodiments is that server 214 (or trader 216 on whose behalf server 214 operates) need not submit to any open market platform trades it is interested in making, so its desire to trade for specified instruments need not become publicly known. No server other than the central server 206 needs to receive the identity of server 214 (or trader 216) before the offer to trade is accepted and a trade is completed.

Figure 3:
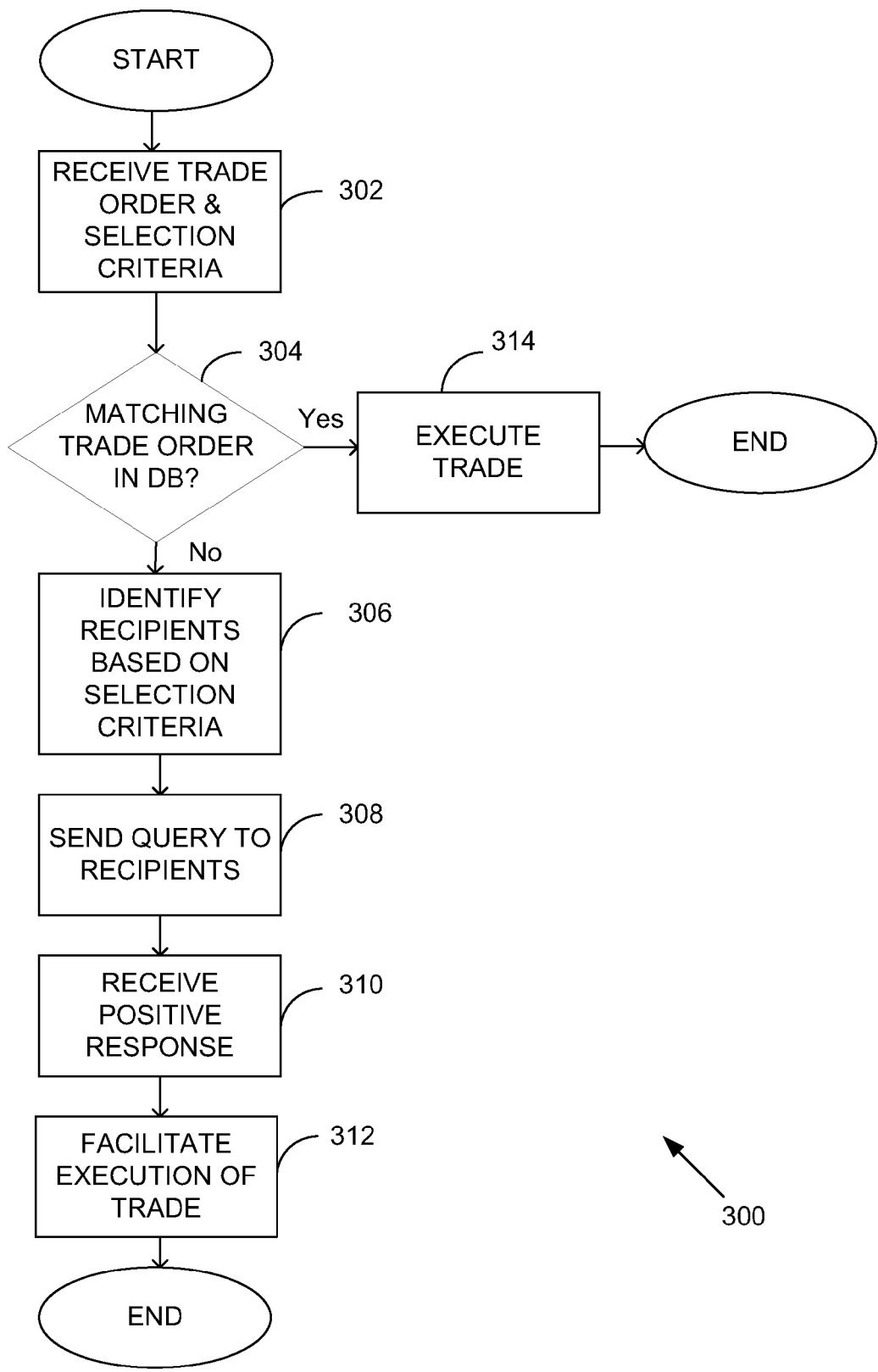
FIG. 3 shows an example process that may be performed by some embodiments.

FIG. 3 illustrates an example process 300 that may be performed by some embodiments. In block 302 a trade order is received. As noted above, the trade order may be submitted by a server 202 and be received by central server 206. (Once again, it should be noted that while the term "central server" is used in this discussion for clarity, the functions ascribed to the central server 206 in this discussion may be executed by any suitably programmed server.) The trade order may be received as part of a communication including other information apart from the trade order. Although a completed trade typically is a purchase or sale of a specified quantity of a specified instrument at a specified price, as discussed further below, in embodiments the trade order initially received may not include all of that information.

In embodiments, in response to receiving the trade order, the central server 206 searches database 208 for a matching trade order that can fill or partially fill the received trade order (block 304). As noted above, database 208 may include as-yet-unfilled trade orders previously submitted by any server or trader. If a matching trade order is found that can fill or partially fill the received trade order, central server 206 facilitates execution of a trade between the entities represented in the received trade order and the matching trade order (block 314). Facilitating execution of the trade may include, for example, passing the parameters of the trade to a clearinghouse to execute the trade.

If no matching trade order is found in database 208 (step 304), or if matching trade orders that are found only partially fill the received trade order, central sever 206 sends a query out to one or more servers 212. (In some embodiments central server 206 does not search a database 208 prior to sending out a query and instead skips to block 306.) The query may include some or all of the terms of the received order, such as specified instrument, specified quantity, and/or specified price. In embodiments, the query does not include any information from which the server or trader submitting the trade order can be identified. In further embodiments, the query does not include the specified quantity. An advantage of such embodiments is that when a trade order seeks a particularly large quantity of an instrument, neither uploading the trade order nor sending the query reveals to the market at large the information that any one entity is seeking such a large quantity of the instrument.

To send the query, central server 206 identifies recipients of the query (block 206). In embodiments the query is sent to recipients a set of all recipients of which the central server 206 is aware or to a subset of that set. For example, database 208 may include a database of servers 212 registered to received queries from central server 206. The database may include traders 216 who are registered to receive queries along with IP addresses and/or other identifying information which central server 206 can use to send a query to servers 212 associated with or operated by or on behalf of traders 216. (Note that more than one trader 216 may be associated with a single server 212.) In embodiments, the central server 206 identifies a subset of recipients according to selection criteria (block 306) as discussed further below. Once the set or subset of recipients has been identified, the query is sent (block 308).

Upon receiving a query from the central server 206, a server 212 determines whether a positive response to the query is appropriate and/or required. Embodiments of processes by which the server 212 may determine whether to send a positive response to the query are discussed below.

If one or more of the servers 212 sends a positive response to the query, central server 206 receives the positive response (block 310). In response to receiving a positive response, the central server 210 may facilitate execution of a trade (block 312).

A positive response may, in embodiments, be any response from server 212 indicating a willingness to trade at least one of the parameters set forth in the query. A positive response may indicate an intent (e.g., of the entity on whose behalf server 212 is operated) to be bound to a trade having the terms set forth in the trade order. In embodiments in which the trade order itself does not include sufficient information to specify a complete trade, the positive response may supply the missing information such that a trade may be executed. For example, where a trade order does not include a specified quantity, or includes a partially specified quantity such as "up to 50,000 shares in 5,000 share increments," the positive response may include a more specific quantity such as "25,000 shares."

In embodiments, the trade order and the positive response, taken together, provide parameters of the transaction with sufficient specificity that a transaction may be completed without any further negotiation between the entity represented by the trade order and the entity represented by the positive response. For example, suppose the specified instrument in the trade order is "any stock of a large-cap energy company," the specified price is "less than $50 per share," and the specified quantity is "at least 50,000 shares." In embodiments in which the positive response must provide enough information that a trade may be completed, without any further negotiation, an acceptable positive response must provide further specificity in the instrument, the price, and the quantity. An example of a suitable positive response is a positive response specifying 70,000 Exxon-Mobil shares at $48 per share. Upon receiving such a positive response (and determining whether the selection criteria, if any, are met), the central server 206 will facilitate the transaction specified in the trade order (e.g. purchase or sale) for 70,000 Exxon-Mobil shares at $48 per share between the entity represented in the trade order and the entity represented in the positive response.

In embodiments, the query and positive response, taken together, provide all parameters of the transaction except the price with sufficient specificity that a trade may be completed without further negotiation. In some such embodiments the system may provide a default price, such as a market price.

In further embodiments, the trade order may provide no more information than a specified instrument. In still further embodiments, the query sent to servers 212 may include less information than the trade order submitted to server 206 on which the query is based. So, for example, the trade order may include an offer to sell 50,000 shares of Microsoft stock, while the corresponding query may ask only whether any trader wishes to purchase Microsoft stock without specifying a quantity. In any event, in embodiments where the query does not include a specified quantity, a positive response may indicate at least the particular instrument to be traded (if required) and a quantity for which the entity represented in the positive response wishes to be bound.

A positive response may also supply a price for the trade where one is not specified in the query. If the positive response does not include a price, the central server 206 (or a clearinghouse to which the server directs the trade for execution) may supply a default price, such as a market price for the instrument being traded. In general, there is no limitation on what information must be in the query and what must be in the positive response, provided that the query, positive response, and any system defaults, taken together, supply enough specificity that a trade may be completed. In embodiments, the query, positive response, and any system defaults, taken together, supply enough specificity that a trade may be completed without further negotiation. What follows are several further examples of combinations of query and positive responses sufficient to complete a trade:

Example 1. Trade order (and query) offers to sell 50,000 shares of Microsoft stock at $50 per share. Positive response accepts the offer. A trade is facilitated for 50,000 shares of Microsoft stock at $50 per share.

Example 2. Trade order (and query) offers to sell 50,000 shares of Microsoft stock at $50 per share. Positive response indicates offer to buy 30,000 shares. In some embodiments, the positive response will be rejected for not satisfying the trade order. In other embodiments, the positive response will be accepted and a trade for 30,000 shares facilitated as long as there is another positive responder willing to buy the outstanding 20,000 shares. In still further embodiments, the positive response will be accepted and a trade facilitated for 30,000 shares regardless of whether other positive responses have been received.

Example 3. Trade order (and query) offers to sell 50,000 shares of Microsoft stock and specifies no price. Positive response accepts the offer without further specificity. In some embodiments, a trade will be facilitated at a default price supplied by the central server 206 or by the clearinghouse executing the trade.

Example 4. Trade order (and query) offers to sell shares of Microsoft stock at least $50 per share. Positive response offers to buy 20,000 shares of Microsoft stock at $50 per share. Trade can be facilitated for 20,000 shares of Microsoft stock at $50 per share, since positive response has supplied the needed specific quantity and specific price.

Example 5. Trade order offers to sell 100,000 shares of Microsoft stock at least $50 per share. The central server sends a query offering to sell shares of Microsoft stock at least $50 per share without specifying the total quantity of shares offered for sale. Positive response offers to buy 20,000 shares of Microsoft stock at $50 per share. Trade can be facilitated for 20,000 shares of Microsoft stock at $50 per share, since positive response has supplied the needed specific quantity and specific price.

In the embodiment of example 5, the central server 206 is configured for additional secrecy by querying a minimum amount of information. In example 5, a trade can be completed for a definite number of shares without revealing the total quantity of shares offered. Thus in embodiments the trade order may include a maximum number of shares offered for trade (for example, so that the central server can evaluate whether the trade order has been filled completely), while the query sent to servers 212 conceals that information.

When a response sufficient to complete a trade is received, the central server 206 facilitates execution of the trade (block 312) by, for example, passing the trade parameters to a clearinghouse which executes the trade or arranges for execution of the trade. In embodiments, a positive response sufficient to complete the trade is binding to the entity represented by the positive response. In embodiments that entity may be a trader operating the server 212, or an organization on whose behalf the trader operates server 212. Server 212 may be operated on behalf of a single entity or on behalf of multiple entities having access to the server or authorizing the server to place orders and/or receive queries and submit binding or nonbinding positive responses.

Where the central server 206 has sent a query to multiple servers 212, it is possible to receive multiple positive responses. In some embodiments, central server 206 addresses these positive responses in the order received. For example, if the first positive response received is sufficient to complete a trade is sufficient to facilitate a trade, the central server 206 will facilitate execution of the trade. If that trade fills the trade order completely, further positive responses may be disregarded. If the trade order remains at least partially unfilled after a trade with the first positive responder is complete, the central server 206 may then proceed to the second positive response received. The central server 206 may process the positive responses in order received until the trade order is completely filled. Alternatively the central server 206 may prioritize the received positive responses in any order other than order received. For example, in some embodiments, if no one of the positive responses indicates a large enough quantity to fill the trade order, the received positive responses may be prioritized according to the quantity specified in the positive response, such that the responder offering the largest number of quantity will trade first. In still other embodiments, the received positive responses may be prioritized according to criteria supplied by the server 202 that submitted the trade order. In still other embodiments, the received positive responses may be prioritized according to criteria supplied by an entity on whose behalf server 202 submitted the trade order. In either of the latter two cases, the prioritizing criteria may be supplied with the trade order. Alternatively the prioritizing criteria may be stored in an entry in database 208 containing trading preferences of the server 202 and/or any entities on whose behalf server 202 is operated.

In some embodiments, if there are positive responses outstanding after the trade order has been filled, the central server 206 may send a notification to any servers 212 that provided positive responses that did not lead to a completed trade. In some embodiments, the central server 206 may send a notification to any servers 212 that provided positive responses that did lead to a completed trade. In still other embodiments the central server 206 may send a suitable message to any server 212 that provided a positive response.

In embodiments, if a trade order remains at least partially unfilled after all positive responses have been processed—either because there was no positive response, because there was no positive responses sufficient to complete a trade, or because the order remains at least partially unfilled even after one or more trades have been facilitated in response to receipt of positive responses—the central server 206 may store the unfilled trade order in database 208. In such embodiments, once stored in database 208, the trade order may be available to match against other incoming trade orders.

In other embodiments, central server 206 may send additional queries based upon an unfilled or partially unfilled trade order. The additional queries may include adjustments to trade parameters that may facilitate a positive response. For example, consider if the first query included an offer to trade shares of an instrument in 10,000 share increments, and processing responses to the first query leaves the trade order upon which the query was based at least partially unfilled, a second query may be sent offering to trade shares of the instrument in 5,000 share increments. In other embodiments, the central server 206 may be configured to repeat queries or send additional queries corresponding to at least partially unfilled trade orders at or after a specified time (such as at 4:45 PM, or at six hours after the initial query), at a specified time prior to the close of business of that day, at a specified time after the opening of a different market, or at any other time.

In embodiments, what to do with an unfilled or partially unfilled trade order may be configurable by a communication from the server 202. Instructions for handling unfilled or partially unfilled trade orders may be specified for a particular trade order, for example, in a communication submitted with the trade order or as part of the process for submitting trade orders. Central server 206 may store default instructions for handling unfilled or partially unfilled trade orders on for each server 202 or each entity on behalf of whom each server 202 operates. Such default instructions may, in embodiments, be overridable by instructions sent for a particular trade order.

As noted previously, in some embodiments, potential trade partners for the trade order submitted to the central server (block 302) can be filtered based upon selection criteria. In some embodiments, the central server 206 may filter recipients of the query based upon selection criteria (block 306). For example, the central server 206 may evaluate possible recipients of the query to determine whether they meet specified requirements before sending a query to that recipient.

Figure 4:
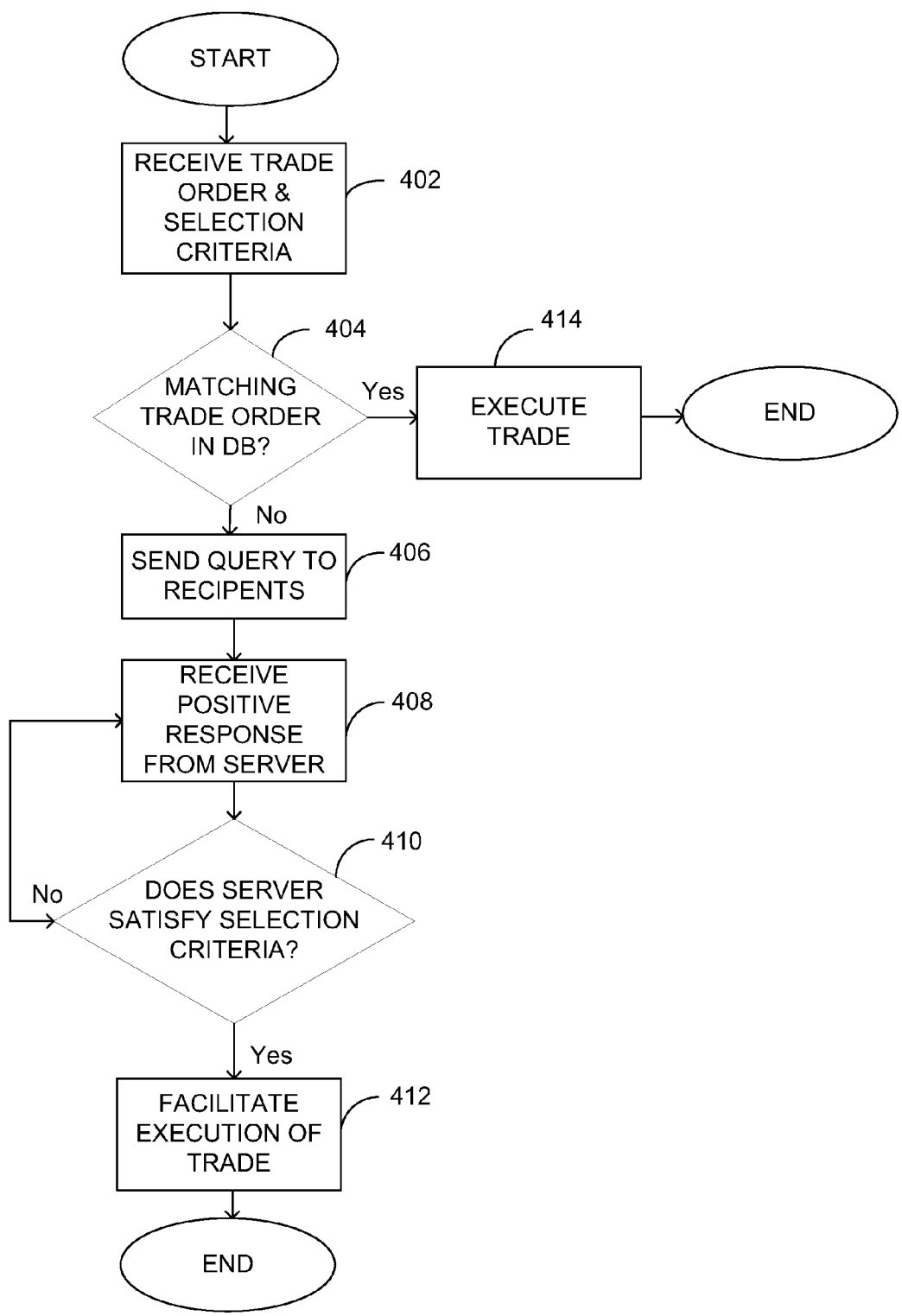
FIG. 4 shows another example process that may be performed by some embodiments.

In other embodiments, the central server 206 sends a query to a set of recipients and filters positive responses based upon the selection criteria. For example, when a positive response is received from a server 212, the central server 206 may evaluate whether the server 212 satisfies the selection criteria, and facilitate a trade based upon the server 212's positive response only if the selection criteria are satisfied. An example of an embodiment of a process in which positive responses are filtered on search criteria is shown in FIG. 4. As in the process of FIG. 3, a trade order is received (block 402). Also as in the process of FIG. 3, the central server 206 may optionally search for a matching trade order in database 208 (block 404) and facilitate a trade if a matching trade order is found (block 414). If no matching trade order is found, or if the trade order remains at least partially unfilled after any trades have been facilitated, the central server 206 sends a query to a set of recipients (block 406), such as servers 212. Upon receiving a positive response from a server 212 (block 408), the central server determines whether the server 212 satisfies the selection criteria (block 410). If the selection criteria are satisfied, a trade is facilitated between the entity represented in the trade order and the entity represented in the positive response (block 412).

Whether applied before the query is sent, or applied to positive responses received, the selection criteria may be received by the server in a variety of suitable ways (block 302, block 402). In block 302 and block 402, the selection criteria may be received from server 202, read from database 208, or obtained or supplied by central server 206 in any other manner.

In embodiments, selection criteria may be provided by the server 202 for a particular trade order. In such embodiments the selection criteria may be sent to the central server 206 by server 202 with the trade order, for example, as part of a communication including the trade order. For example, the server 202 may send a trade order to central server 206 along with information that effective tells central server 206 how to select the servers 212 that will receive a query based upon the trade order. (Forms that the selection criteria may take are discussed further below.) In other embodiments, the central server 206 is in communication with a database 208 that stores preferred selection criteria for the server 202. For example, in embodiments in which servers 202 registers with central server 206 prior to submitting trade orders to server 206, the registration process may store a record in database 208 containing information about server 202 including trading preferences. These trading preferences can include selection criteria to be applied for all trade orders submitted by server 202. Alternatively, the database 208 can store default selection criteria to be applied to server 202 only where server 202 does not submit particular selection criteria for a particular trade order. Selection criteria may be stored for each server 202 and/or for entity on whose behalf server 202 submits trade orders.

In embodiments, selection criteria relate to aspects of the trading history of server 212 or of the trader 216 or other entity on whose behalf a positive response is submitted. In such embodiments, the central server 206 may have access to a database (for example, database 208) in which is stored information about the trading histories of potential recipients servers 212 or of traders or entities associated with servers 212. A query may be sent only to those servers (or traders or entities) having a trading history that satisfies certain specified requirements. For example, it may desirable to limit query recipients only to those most likely to respond, in order to control access to information in the trade order. For that reason selection criteria may include servers (or entities) having a positive response rate that exceeds a certain specified rate. In embodiments selection criteria be based upon the positive response rate for queries relating to particular types of instruments. Examples of possible selection criteria include:

Example 1: servers or entities having a minimum overall positive response rate; servers or entities whose overall positive response rate exceeds 50%.

Example 2: servers or entities having a minimum positive response rate for a specified instrument, including the specified instrument of the trade order or a different specified instrument; servers or entities whose positive response rate for Microsoft stock exceeds 60%; servers or entities whose positive response rate for Exxon-Mobil derivatives exceeds 75%.

Example 3: servers or entities having a minimum positive response rate for instruments relating to a particular entity; servers or entities whose positive response rate for any instrument relating to IBM exceeds 50%.

Example 4: servers or entities having a minimum positive response rate for instruments relating to a particular industry; servers or entities whose positive response rate for any instrument relating to energy trading exceeds 50%; servers or entities whose positive response rate for oil futures exceeds 75%.

Example 5: servers or entities having a minimum positive response rate for instruments having a particular market capitalization; servers or entities whose positive response rate for large-cap stocks exceeds 60%.

Example 6: servers or entities having a minimum positive response rate for instruments relating to any enumerated set of instruments; servers or entities whose positive response rate for Coca-Cola stock and Pepsi put options exceeds 50%; servers or entities whose positive response rate for stocks and options exceeds 60%; servers or entities whose positive response rate for Dell, Gateway, and IBM exceeds 40%.

Example 7: servers or entities having a minimum positive response rate for instruments characterized by a specified parameter; servers or entities whose positive response rate for stock relating to any company having a price-to-earnings ratio of 20 or better exceeds 50%; servers or entities whose positive response rate for instruments listed on NASDAQ exceeds 70%.

Example 8: servers or entities having a minimum positive response rate for a specified instrument or any substitutable instrument.

Example 9: servers or entities having a minimum positive response rate for orders exceeding a specified value; servers or entities whose positive response rate for orders worth more than $10M exceeds 50%; servers or entities whose positive response rate for orders of 1,000,000 shares or more exceeds 30%.

Selection criteria based upon the trading history of a server or entity may be any criteria or combination of criteria for which trading history records are stored. Selection criteria need not be based upon a minimum positive response rate, but may instead be based upon other aspects of the trading history, such as trading volume, trading frequency, or history of making trades at or exceeding a particular volume or total value. For example:

Example 10: servers or entities who have participated in at least one trade exceeding $10M in total value within the past month; servers or entities who have participated in at least three trades exceeding $1M in total value within the past week.

Example 11: servers or entities who have purchased at least 30 million shares, aggregate, within the past month; servers or entities who have purchased at least 1 million shares in the energy industry within the past month; servers or entities who have sold at least $30M in total value within the past week.

Example 12: servers or entities who participate in at least ten trades per day; servers or entities who have participated in at least ten trades per day within the past month; servers or entities who have participated in at least ten trades in the energy sector within the past week; servers or entities who have not purchased any Microsoft stock within the past year.

In general, the selection criteria may be any criteria at all by which query recipients may be selected (for example, in the embodiments of FIG. 3), or by which positive responders may be filtered (for example, in the embodiments of FIG. 4).

Figure 5:
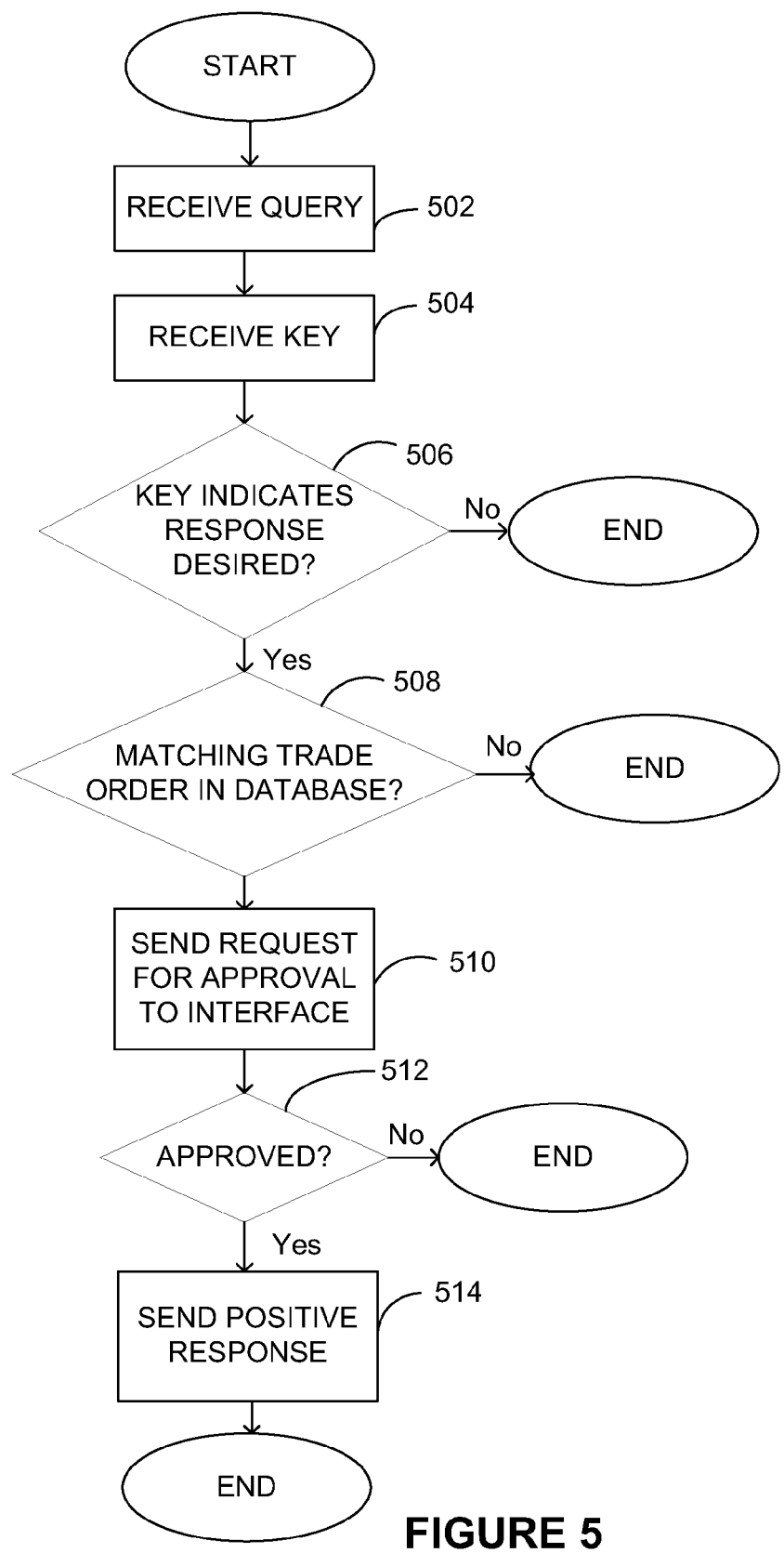
FIG. 5 shows another example process that may be performed by some embodiments.

FIG. 5 is an example of a process that may be performed by a server 212 receiving a query sent by a central server 206 in response to receiving a query sent by a central server 206. In embodiments, the central server 206 sends the query in response to receiving a trade order from a server 202, as described above. Also as described above, the central server 206 may send the query to all registered recipients 212 or select the recipient 212 based upon selection criteria. Server 212 receives the query (block 502).

In some embodiments, central server 212 sends a query to a set of recipients that include recipients that fail to meet selection criteria; in some such embodiments only positive responses from certain recipient servers (or on behalf of certain entities) will lead to the central server 206 facilitating a trade. As noted above, in some such embodiments the central server 206 filters positive responses by determining whether the server sending the positive response (or the entity represented by the positive response) meets the selection criteria. In other embodiments, the query may include a key that recipient server 212 can interpret to determine whether server 212 is an intended recipient of the query, i.e., a recipient from which a positive response will lead to the central server 206 facilitating a trade. The key can be any string of data interpretable by the recipient server 212. The key may be sent with the query or before or after the query is sent.

Once the recipient server 212 has received the key (block 504) it interprets the key (block 506) to determine whether it is an intended recipient, i.e., whether its positive response would be honored by the central server 206 and lead to the central server 206 facilitating a trade. If the key indicates that server 212 is not an intended recipient, no further action of server 212 is required.

If the key indicates that server 212 is an intended recipient, server 212 may determine whether a positive response to the query is required, i.e., whether a trader or other entity associated with server 212 would like to accept the offer represented in the query received from central server 206. In embodiments, server 212 may search a database 214 of trades that traders or other entities associated with server 212 are interested in making (block 508). If database 214 contains a matching trade, server 212 may send a positive response (block 514). In some embodiments, before sending a positive response, server 212 requests approval of the trade from a human operator (block 512). For example, server 212 may display a request for approval to a terminal operated by the human operator and receive an input from the human operator indicating approval or non-approval of the trade. If additional parameters (such as, for example, a quantity of the specified instrument to be traded) are required to complete a trade, the server 212 may request those additional parameters from the human operator and receive them as input from the human operator. Upon receiving approval from the human operator (along with any parameters that the human operator supplies to fully specify the trade), server 212 may send a positive response to the query (block 514). Central server 206 may receive the positive response and process it in any of the ways described above, including facilitating a trade between the entity submitting the original trade order and the entity represented by the positive response. In embodiments, sending the positive response binds the entity represented by the positive response to a trade without the opportunity for further negotiation.

In some embodiments, the steps of receiving and interpreting the key (blocks 504 and 506) may be skipped. In embodiments in which a key is used, server 212 may search for a matching trade in database 214 (block 508) and/or request approval of the trade (block 512) before interpreting the key.

Server 212 may, in some embodiments, request approval from a human operator prior to searching for a matching trade in database 214. In still further embodiments, server 212 may request approval from a human operator and not search for a matching trade at all.

XII. More Embodiments

The following should be interpreted as embodiments, not as claims.

1. A method comprising: receiving, from a first server operated on behalf of a first trader, a communication including a first trade order and one or more selection criteria, the first trade order including at least one of a specified instrument, a specified quantity, and a specified price; determining that a database of trade orders does not contain a second trade order matching the first trade order; identifying a plurality of second traders satisfying the selection criteria; sending, to a plurality of second servers, each second server operated on behalf of one or more of the plurality of second traders, a query including at least one of the specified instrument, the specified quantity, and the specified price; receiving, from a one of the plurality of second servers operated on behalf of a one of the plurality of second traders, a positive response to the query; and facilitating execution of a trade between the first trader and the one of the plurality of second traders for the specified instrument at the specified price.

2. The method of claim 1, wherein identifying a plurality of second traders includes determining that a trading history of each of the plurality of second traders satisfies one or more of the selection criteria.

3. The method of claim 2, wherein the trading history of each of the plurality of second traders includes a positive response rate and the selection criteria include a minimum positive response rate, and wherein determining that the trading history of each of the plurality of second traders satisfies one or more of the selection criteria includes: determining that the positive response rate of each of the plurality of second traders equals or exceeds the minimum positive response rate.

4. The method of claim 2, wherein the trading history of each of the plurality of second traders includes a positive response rate for the specified instrument and the selection criteria include a minimum positive response rate for the specified instrument, and wherein determining that the trading history of each of the plurality of second traders satisfies one or more of the selection criteria includes: determining that the positive response rate for the specified instrument of each of the plurality of second traders equals or exceeds the minimum positive response rate for the specified instrument.

5. The method of claim 2, wherein the trading history of each of the plurality of second traders includes a positive response rate for a set of instruments and the selection criteria include a minimum positive response rate for the set of instruments, and wherein determining that the trading history of each of the plurality of second traders satisfies one or more of the selection criteria includes: determining that the positive response rate for the set of instruments of each of the plurality of second traders equals or exceeds the minimum positive response rate for the set of instruments.

6. The method of claim 5, wherein the set of instruments includes instruments relating to a particular entity.

7. The method of claim 5, wherein the set of instruments includes instruments relating to a particular industry.

8. The method of claim 5, wherein the set of instruments includes instruments associated with entities having a particular market capitalization.

9. The method of claim 5, wherein the set of instruments includes an enumerated set of instruments.

10. The method of claim 5, wherein the set of instruments includes any instrument characterized by a specified parameter.

11. The method of claim 5, wherein the set of instruments includes the specified instrument and an instrument substitutable for the specified instrument.

12. The method of claim 1, wherein the first server includes an order management system.

12a. The method of claim 1, wherein the first server is in communication with an order management system.

13. The method of claim 1, wherein at least one of the plurality of second servers includes an order management system.

13a. The method of claim 1, wherein at least one of the plurality of second servers is in communication with an order management system.

14. The method of claim 1, wherein sending a query further comprises: formatting the query in a format readable by an order management system.

15. A method comprising: receiving, from a first server, a communication including a trade order and one or more selection criteria, the trade order indicating an intent of a first trader to trade a specified instrument at least one of a specified quantity and a specified price; identifying a plurality of second traders satisfying the selection criteria; sending to at least one second server, each of the at least one second servers being operable to enter trades on behalf of one or more of the plurality of second traders, a query including at least one of the specified instrument, the specified quantity, and the specified price; receiving, from a one of the at least one second servers, a positive response to the query, the positive response indicating an intent of a one of the plurality of second traders to trade the specified instrument at the specified price; and facilitating execution of a trade between the first trader and the one of the plurality of second traders for the specified instrument at the specified price.

15a. The method of claim 15, wherein at least one of the second servers is operable to enter trades on behalf of one or more of the plurality of second traders in response to an input from a user.

15b. The method of claim 15, wherein at least one of the second servers is operable to enter trades on behalf of one or more of the plurality of second traders without input from a user.

16. The method of claim 15, wherein identifying a plurality of second traders includes determining that a trading history of each of the plurality of second traders satisfies one or more of the selection criteria.

17. The method of claim 16, wherein the trading history of each of the plurality of second traders includes a positive response rate, and the selection criteria include a minimum positive response rate and wherein determining that the trading history of each of the plurality of second traders satisfies one or more of the selection criteria includes: determining that the positive response rate of each of the plurality of second traders equals or exceeds the minimum positive response rate.

18. The method of claim 17, wherein the trading history of each of the plurality of second traders includes a positive response rate for the specified instrument and the selection criteria include a minimum positive response rate for the specified instrument, and wherein determining that the trading history of each of the plurality of second traders satisfies one or more of the selection criteria includes: determining that the positive response rate for the specified instrument of each of the plurality of second traders equals or exceeds the minimum positive response rate for the specified instrument.

19. A method comprising: receiving, from a first server, a communication including a trade order and one or more selection criteria, the trade order including at least one of a specified instrument, a specified quantity, and a specified price; identifying at least one second server satisfying the selection criteria; sending to the at least one second server a query including at least one of the specified instrument, the specified quantity, and the specified price; receiving, from a one of the at least one second servers, a positive response to the query; and facilitating execution of a trade against the trade order for the specified instrument at the specified price.

20. The method of claim 19, wherein identifying at least one second server includes determining that a trading history of the at least one second server satisfies one or more of the selection criteria.

21. The method of claim 20, wherein the trading history of the at least one second server includes a positive response rate and the selection criteria include a minimum positive response rate, and wherein determining that the trading history of the at least one second server satisfies one or more of the selection criteria includes: determining that the positive response rate of the at least one second server equals or exceeds the minimum positive response rate.

22. The method of claim 20, wherein the trading history of the at least one second server includes a positive response rate for the specified instrument and the selection criteria include a minimum positive response rate for the specified instrument, and wherein determining that the trading history of the at least one second server satisfies one or more of the selection criteria includes: determining that the positive response rate for the specified instrument of the at least one second server equals or exceeds the minimum positive response rate for the specified instrument.

23. A method comprising: Receiving, from a first server operated on behalf of a first trader, a communication including a first trade order and one or more selection criteria, the first trade order including at least one of a specified instrument, a specified quantity, and a specified price; determining that a database of trade orders does not contain a second trade order matching the first trade order; sending, to a plurality of second servers, each second server operated on behalf of a one of a plurality of second traders, a query including at least one of the specified instrument, the specified quantity, and the specified price; receiving, from a one of the plurality of second servers operated on behalf of a one of the plurality of second traders, a positive response to the query; determining that the one of the plurality of second traders satisfies the selection criteria; and facilitating execution of a trade between the first trader and the one of the plurality of second traders for the specified instrument at the specified price.

24. The method of claim 23, wherein determining that the one of the plurality of second traders satisfies the selection criteria includes determining that a trading history of the one of the plurality of second traders satisfies the selection criteria.

25. The method of claim 24, wherein the trading history of the one of the plurality of second traders includes a positive response rate and the selection criteria include a minimum positive response rate, and wherein determining that the trading history of the one of the plurality of second traders satisfies one or more of the selection criteria includes: determining that the positive response rate of the one of the plurality of second traders equals or exceeds the minimum positive response rate.

26. The method of claim 24, wherein the trading history of the one of the plurality of second traders includes a positive response rate for the specified instrument and the selection criteria include a minimum positive response rate for the specified instrument, and wherein determining that the trading history of the one of the plurality of second traders satisfies one or more of the selection criteria includes: determining that the positive response rate for the specified instrument of the one of the plurality of second traders equals or exceeds the minimum positive response rate for the specified instrument.

27. A method comprising: receiving, from a first server, a communication including a trade order and one or more selection criteria, the trade order indicating an intent of a first trader to trade a specified instrument at least one of a specified quantity and a specified price; sending, to a plurality of second servers, each second server being operable to enter trades on behalf of one or more second traders, a query including at least one of the specified instrument, the specified quantity, and the specified price; receiving, from a one of the plurality of second servers, a positive response to the query, the positive response indicating an intent of a one of the one or more second traders to trade the specified instrument at the specified price; determining that the one of the one or more second traders satisfies the selection criteria; and facilitating execution of a trade between the first trader and the one of the one or more second traders for the specified instrument at the specified price.

27a. The method of claim 27, wherein at least one of the second servers is operable to enter trades on behalf of one or more of the plurality of second traders in response to an input from a user.

27b. The method of claim 27, wherein at least one of the second servers is operable to enter trades on behalf of one or more of the plurality of second traders without input from a user.

28. The method of claim 27, wherein determining that the one of the one or more second traders satisfies the selection criteria includes determining that a trading history of the one of the one or more second traders satisfies the selection criteria.

29. The method of claim 28, wherein the trading history of the one of the one or more second traders includes a positive response rate and the selection criteria include a minimum positive response rate, and wherein determining that the trading history of the one of the one or more second traders satisfies one or more of the selection criteria includes: determining that the positive response rate of the one of the one or more second traders equals or exceeds the minimum positive response rate.

30. The method of claim 28, wherein the trading history of the one of the one or more second traders includes a positive response rate for the specified instrument and the selection criteria include a minimum positive response rate for the specified instrument, and wherein determining that the trading history of the one of the one or more second traders satisfies one or more of the selection criteria includes: determining that the positive response rate for the specified instrument of the one of the one or more second traders equals or exceeds the minimum positive response rate for the specified instrument.

31. A method comprising: receiving, from a first server, a communication including a trade order and one or more selection criteria, the trade order including at least one of a specified instrument, a specified quantity, and a specified price; sending, to at least one second server, a query including at least one of the specified instrument, the specified quantity, and the specified price; receiving, from a one of the at least one second servers, a positive response to the query; determining that the one of the at least one second servers satisfies the selection criteria; and facilitating execution of a trade against the trade order for the specified instrument at the specified price.

32. The method of claim 31, wherein determining that the one of the one or more second traders satisfies the selection criteria includes determining that a trading history of the one of the one or more second traders satisfies the selection criteria.

33. The method of claim 32, wherein the trading history of the one of the one or more second traders includes a positive response rate and the selection criteria include a minimum positive response rate, and wherein determining that the trading history of the one of the one or more second traders satisfies one or more of the selection criteria includes: determining that the positive response rate of the one of the one or more second traders equals or exceeds the minimum positive response rate.

34. The method of claim 32, wherein the trading history of the one of the one or more second traders includes a positive response rate for the specified instrument and the selection criteria include a minimum positive response rate for the specified instrument, and wherein determining that the trading history of the one of the one or more second traders satisfies one or more of the selection criteria includes: determining that the positive response rate for the specified instrument of the one of the one or more second traders equals or exceeds the minimum positive response rate for the specified instrument.

35. A method comprising: receiving, from a first server, a communication including a trade order, the trade order indicating an intent of a first trader to trade a specified instrument at least one of a specified quantity and a specified price; identifying a plurality of second traders satisfying one or more selection criteria; sending to at least one second server, each of the at least one second servers being operable to enter trades on behalf of one or more of the plurality of second traders, a query including at least one of the specified instrument, the specified quantity, and the specified price; receiving, from a one of the at least one second servers, a positive response to the query, the positive response indicating an intent of a one of the plurality of second traders to trade the specified instrument at the specified price; and facilitating execution of a trade between the first trader and the one of the plurality of second traders for the specified instrument at the specified price.

35a. The method of claim 35, wherein at least one of the second servers is operable to enter trades on behalf of one or more of the plurality of second traders in response to an input from a user.

35b. The method of claim 35, wherein at least one of the second servers is operable to enter trades on behalf of one or more of the plurality of second traders without input from a user.

36. The method of claim 35, further comprising: receiving at least one of the one or more selection criteria from the first server.

37. The method of claim 36, wherein the communication further includes at least one of the one or more selection criteria.

38. The method of claim 35, further comprising: retrieving at least one of the one or more selection criteria from a database.

39. A method comprising: receiving, from a first server, a communication including a trade order, the trade order indicating an intent of a first trader to trade a specified instrument at least one of a specified quantity and a specified price; sending, to a plurality of second servers, each second server being operable to enter trades on behalf of one or more second traders, a query including at least one of the specified instrument, the specified quantity, and the specified price; receiving, from a one of the plurality of second servers, a positive response to the query, the positive response indicating an intent of a one of the one or more second traders to trade the specified instrument at the specified price; determining that the one of the one or more second traders satisfies one or more selection criteria; and facilitating execution of a trade between the first trader and the one of the one or more second traders for the specified instrument at the specified price.

39a. The method of claim 39, wherein at least one of the second servers is operable to enter trades on behalf of one or more of the plurality of second traders in response to an input from a user.

39b. The method of claim 39, wherein at least one of the second servers is operable to enter trades on behalf of one or more of the plurality of second traders without input from a user.

40. The method of claim 39, further comprising: receiving at least one of the one or more selection criteria from the first server.

41. The method of claim 40, wherein the communication further includes at least one of the one or more selection criteria.

42. The method of claim 39, further comprising: retrieving at least one of the one or more selection criteria from a database.

43. A method comprising: receiving, from a first server, a communication including a trade order, the trade order indicating an intent of a first trader to trade a specified instrument at least one of a specified quantity and a specified price; sending, to a second server operable to enter trades on behalf of a second trader, a query including at least one of the specified instrument, the specified quantity, and the specified price; receiving, from the second server, a positive response to the query; and facilitating execution of a trade between the first trader and the second trader for the specified instrument at the specified price.

43a. The method of claim 43, wherein at least one of the second servers is operable to enter trades on behalf of one or more of the plurality of second traders in response to an input from a user.

43b. The method of claim 43, wherein at least one of the second servers is operable to enter trades on behalf of one or more of the plurality of second traders without input from a user.

44. The method of claim 43, further comprising: sending, to the second server, a key indicating that a response from the second server is desired.

45. The method of claim 44, wherein the query includes the key.

46. A method comprising: receiving, from a first server, a communication including a trade order, the trade order indicating an intent of a first trader to trade a specified instrument; sending, to a second server operable to enter trades on behalf of a second trader, a query indicating the specified instrument; receiving, from the second server, a positive response to the query; and facilitating execution of a trade between the first trader and the second trader for a specified quantity of the specified instrument.

46a. The method of claim 46, wherein the trade order includes the specified quantity.

46b. The method of claim 46, wherein the positive response to the query includes the specified quantity.

47. The method of claim 46, wherein the trade order further includes information sufficient to determine a price for the trade, and wherein facilitating execution further comprises facilitating execution of the trade between the first trader and the second trader for a specified quantity of the specified instrument at the determined price.

48. The method of claim 47, wherein the determined price is a specified price.

49. The method of claim 46, wherein the trade order includes a specified price, and wherein facilitating execution further comprises facilitating execution of the trade between the first trader and the second trader for a specified quantity of the specified instrument at the specified price.

50. The method of claim 46, wherein facilitating execution further comprises facilitating execution of the trade between the first trader and the second trader for a specified quantity of the specified instrument at a market price.

50aa. The method of claim 46, wherein facilitating execution further comprises facilitating execution of the trade between the first trader and the second trader for a specified quantity of the specified instrument at a market midpoint price.

50a. A method comprising: receiving, from a first server, a communication including a trade order, the trade order indicating an intent of a first trader to trade a specified instrument; sending, to a plurality of second servers, each second server being operable to enter trades on behalf of one or more second traders, a query indicating the specified instrument; receiving, from a one of the plurality of second servers, a positive response to the query, the positive response indicating an intent of a one of the one or more second traders to trade the specified instrument; determining that the one of the one or more second traders satisfies one or more selection criteria; and facilitating execution of a trade between the first trader and the one of the one or more second traders for a specified quantity of the specified instrument.

50b. The method of claim 50a, wherein the trade order includes the specified quantity.

50c. The method of claim 50a, wherein the positive response to the query includes the specified quantity.

50d. The method of claim 50a, wherein the trade order further includes information sufficient to determine a price for the trade, and wherein facilitating execution further comprises facilitating execution of the trade between the first trader and the second trader for a specified quantity of the specified instrument at the determined price.

50e. The method of claim 50a, wherein the determined price is a specified price.

50f. The method of claim 50a, wherein the trade order includes a specified price, and wherein facilitating execution further comprises facilitating execution of the trade between the first trader and the second trader for a specified quantity of the specified instrument at the specified price.

50g. The method of claim 50a, wherein facilitating execution further comprises facilitating execution of the trade between the first trader and the second trader for a specified quantity of the specified instrument at a market price.

50ga. The method of claim 50a, wherein facilitating execution further comprises facilitating execution of the trade between the first trader and the second trader for a specified quantity of the specified instrument at a market midpoint price.

50h. The method of claim 50a, wherein determining that the one of the one or more second traders satisfies the selection criteria includes determining that a trading history of the one of the one or more second traders satisfies the selection criteria.

50i. The method of claim 50h, wherein the trading history of the one of the one or more second traders includes a positive response rate and the selection criteria include a minimum positive response rate, and wherein determining that the trading history of the one of the one or more second traders satisfies one or more of the selection criteria includes: determining that the positive response rate of the one of the one or more second traders equals or exceeds the minimum positive response rate.

50j. The method of claim 50h, wherein the trading history of the one of the one or more second traders includes a positive response rate for the specified instrument and the selection criteria include a minimum positive response rate for the specified instrument, and wherein determining that the trading history of the one of the one or more second traders satisfies one or more of the selection criteria includes: determining that the positive response rate for the specified instrument of the one of the one or more second traders equals or exceeds the minimum positive response rate for the specified instrument.

50k. A method comprising: receiving, from a first server, a communication including a trade order, the trade order indicating an intent of a first trader to trade a specified instrument; identifying a plurality of second traders satisfying one or more selection criteria; sending to at least one second server, each of the at least one second servers being operable to enter trades on behalf of one or more of the plurality of second traders, a query indicating the specified instrument; receiving, from a one of the plurality of second servers, a positive response to the query, the positive response indicating an intent of a one of the one or more second traders to trade the specified instrument; and facilitating execution of a trade between the first trader and the one of the one or more second traders for a specified quantity of the specified instrument.

50l. The method of claim 50k, wherein the trade order includes the specified quantity.

50m. The method of claim 50k, wherein the positive response to the query includes the specified quantity.

50n. The method of claim 50k, wherein the trade order further includes information sufficient to determine a price for the trade, and wherein facilitating execution further comprises facilitating execution of the trade between the first trader and the second trader for a specified quantity of the specified instrument at the determined price.

50o. The method of claim 50k, wherein the determined price is a specified price.

50p. The method of claim 50k, wherein the trade order includes a specified price, and wherein facilitating execution further comprises facilitating execution of the trade between the first trader and the second trader for a specified quantity of the specified instrument at the specified price.

50q. The method of claim 50k, wherein facilitating execution further comprises facilitating execution of the trade between the first trader and the second trader for a specified quantity of the specified instrument at a market price.

50qa. The method of claim 50k, wherein facilitating execution further comprises facilitating execution of the trade between the first trader and the second trader for a specified quantity of the specified instrument at a market midpoint price.

50r. The method of claim 50k, wherein determining that the one of the one or more second traders satisfies the selection criteria includes determining that a trading history of the one of the one or more second traders satisfies the selection criteria.

50s. The method of claim 50r, wherein the trading history of the one of the one or more second traders includes a positive response rate and the selection criteria include a minimum positive response rate, and wherein determining that the trading history of the one of the one or more second traders satisfies one or more of the selection criteria includes: determining that the positive response rate of the one of the one or more second traders equals or exceeds the minimum positive response rate.

50t. The method of claim 50r, wherein the trading history of the one of the one or more second traders includes a positive response rate for the specified instrument and the selection criteria include a minimum positive response rate for the specified instrument, and wherein determining that the trading history of the one of the one or more second traders satisfies one or more of the selection criteria includes: determining that the positive response rate for the specified instrument of the one of the one or more second traders equals or exceeds the minimum positive response rate for the specified instrument.

51. A method comprising: receiving, from a first server, a communication including a key and a query, the query including at least one of a specified instrument, a specified quantity, and a specified price; determining, based upon the key, that a response to the query is desired; retrieving, from a database, a matching trade order including at least one of the specified instrument, specified quantity, and specified price; providing a request for approval to an interface operated by a user; receiving a response to the request for approval from the interface operated by the user; and sending a positive response to the query to the first server, the positive response indicating an intent to be bound to trade for the specified instrument at the specified price.

52. The method of claim 51, wherein the database of trade orders resides on an order management system.

52a. The method of claim 51, wherein the database of trade orders is in communication with an order management system.

52b. The method of claim 51, wherein the database of trade orders is a portion of an order management system.

53. A method comprising: receiving, from a first server, a query including at least one of a specified instrument, a specified quantity, and a specified price; retrieving, from a database, a matching trade order including at least one of the specified instrument, specified quantity, and specified price; providing a request for approval to an interface operated by a user; receiving a response to the request for approval from the interface operated by the user; and sending a positive response to the query to the first server, the positive response indicating an intent to be bound to trade for the specified instrument at the specified price.

54. The method of claim 53, wherein the database of trade orders resides on an order management system.

54a. The method of claim 53, wherein the database of trade orders is in communication with an order management system.

54b. The method of claim 53, wherein the database of trade orders is a portion of an order management system.

55. A method comprising: receiving, from a first server, a query including at least one of a specified instrument, a specified quantity, and a specified price; retrieving, from a database, a matching trade order including at least one of the specified instrument, specified quantity, and specified price; and sending a positive response to the query to the first server, the positive response indicating an intent to be bound to trade for the specified instrument at the specified price.

56. The method of claim 55, wherein the database of trade orders resides on an order management system.

56a. The method of claim 55, wherein the database of trade orders is in communication with an order management system.

56b. The method of claim 55, wherein the database of trade orders is a portion of an order management system.

57. A method comprising: receiving, from a first server, a query including a specified instrument; retrieving, from a database, a matching trade order including at least the specified instrument and a specified quantity; and sending a positive response to the query to the first server, the positive response indicating an intent to be bound to trade for the specified quantity of the specified instrument.

58. The method of claim 57, wherein the query further includes information sufficient to determine a price for the trade, and wherein the positive response further indicates an intent to be bound to trade at the determined price.

59. The method of claim 58, wherein the determined price is a specified price.

60. The method of claim 57, wherein the query further includes a specified price, and wherein the positive response further indicates an intent to be bound to trade at the specified price.

61. The method of claim 57, wherein the positive response further indicates an intent to be bound to trade at a market price.

61a. The method of claim 57, wherein the positive response further indicates an intent to be bound to trade at a market midpoint price.

62. The method of claim 57, wherein the database of trade orders resides on an order management system.

62a. The method of claim 57, wherein the database of trade orders is in communication with an order management system.

62b. The method of claim 57, wherein the database of trade orders is a portion of an order management system.

What is claimed is:

1. A method comprising the steps of:
   at one or more trading computer(s), receiving trading orders from trading entities, the trading orders each including a specified instrument, and at least one of a specified quantity and a specified price, and storing the trading orders without making the trading orders known to open market platforms;
   sending from trading computer(s) that store the trading orders to one or more query-receiving ones of the trading computers queries seeking matches for trading orders stored at the query-sending trading computer(s), the queries specifying the specified instrument, and at least one of the specified quantity and the specified price;
   at the query-receiving trading computer(s), attempting to match received queries against trading orders stored at the respective query-receiving trading computer while keeping trading orders and queries confidential from trading entities other than the entities that entered the respective trading orders, and informing a trading entity of a received query only when a match is detected between one of the trading entity's orders and a received query, the informing being to obtain approval of the trading entity to trade between the matched trading order and the matched received inquiry; and
   facilitating execution of a trade between the trading entity associated with the trading order underlying the query matched by the query-receiving trading computer and the trading entity associated with the matching trading order.

2. The method of claim 1
   wherein the one or more trading computers are trading computers under control of and secure to respective trading entities;
   and further comprising the step of storing the trading orders on the trading computers of the respective entities from whom the orders are received without making the trading orders known to open market platforms.

3. The method of claim 1, wherein the queries relating to respective orders are sent to query-receiving trading computer(s) based on selection criteria specified by the trading entity that entered the respective trading orders.

4. The method of claim 3, wherein the selection criteria include trading history of trading entities to receive the queries.

5. The method of claim 4, wherein the trading history of the selection criteria include a minimum positive response rate for the specified instrument to be met by the recipient trading entity before the respective query is sent to that recipient trading entity.

6. The method of claim 4, wherein the trading history of the selection criteria include a minimum positive response rate for a specified set of instruments to be met by the recipient trading entity before the respective query is sent to that recipient trading entity.

7. The method of claim 6, wherein the set of instruments specified by a trading order is specified by the entity that entered the trading order, with relation to a particular entity.

8. The method of claim 6, wherein the set of instruments is specified by relation to entities having a particular market capitalization.

9. The method of claim 6, wherein the set of instruments includes an set of instruments enumerated by the entity that entered the trading order.

10. The method of claim 6, wherein the set of instruments includes any instrument characterized by a parameter specified by the entity that entered the trading order.

11. The method of claim 6, wherein the set of instruments includes the specified instrument and an instrument substitutable for the specified instrument.

12. The method of claim 1, wherein the trading orders are received from the trading entities into an order management system.

13. The method of claim 1, wherein at least one of the query-receiving trading computer(s) is operable to receive trading orders on behalf of trading entities in response to an input from a user.

14. The method of claim 1, wherein at least one of the query-receiving trading computer(s) is operable to receive trading orders on behalf of trading entities without input from a user.

15. The method of claim 1, wherein:
   at least one of the trading-order receiving computer(s) is operable to receive trading orders on behalf of respective entitie(s) of the plurality of trading entities in response to an input from a user.

16. The method of claim 1, wherein:
   at least one of the trading-order receiving computer(s) is operable to receive trading orders on behalf of respective entitie(s) of the plurality of trading entities without input from a user.

17. The method of claim 1, further comprising:
   sending the queries from a central server.

18. The method of claim 1, further comprising:
   sending the queries from trading computerLs) associated with the respective trading entities.

19. The method of claim 1, further comprising:
obtain approval of the trading entity is sufficient to bind a trading entity to a trade.

20. The method of claim 1, wherein:
the query requests trading execution at a default price.

21. The method of claim 20, wherein:
the default price is a market price for the specified instrument.

22. The method of claim 20, wherein:
the default price is the market midpoint price for the specified instrument.

23. The method of claim 1, further comprising:
informing a trading entity of a received query but withholding the full size of the query.

24. The method of claim 1, further comprising:
after executing a partial fill of one of the trading orders, sending further queries seeking further matches for trading orders to complete the trading order.

25. The method of claim 1, further comprising:
prioritizing trading orders and/or queries by quantity.

26. The method of claim 1, wherein:
the positive response to the query includes the specified quantity.

27. The method of claim 1, wherein:
the trade order further includes information sufficient to determine a price for the trade, and wherein facilitating execution further comprises facilitating execution of the trade between the first trader and the second trader for a specified quantity of the specified instrument at the determined price.

28. The method of claim 27, wherein the determined price is a price specified by the entity that entered the trading order.

29. The method of claim 1, wherein:
the trade order includes a specified price, and wherein facilitating execution further comprises facilitating execution of the trade between the first trader and the second trader for a specified quantity of the specified instrument at the specified price.

30. The method of claim 1, wherein:
facilitating execution further comprises facilitating execution of the trade between the first trader and the second trader for a specified quantity of the specified instrument at a market price.

31. The method of claim 1, wherein:
facilitating execution further comprises facilitating execution of the trade between the trading entity that entered the matched trading order and a trading entity that confirms the matched query for a specified quantity of the specified instrument at a market midpoint price.

32. The method of claim 1, wherein:
obtaining approval comprises obtaining approval from a human trader.

33. The method of claim 1, further comprising:
sending notification of execution to trading entities other than those whose trading orders matched for the trade.

34. One or more computer-readable, nontransitory memories, having embedded thereon programs to cause one or more computer(s) to:
receive trading orders from trading entities, the trading orders each including a specified instrument, and at least one of a specified quantity and a specified price, and store the trading orders at one or more trading computer(s) without making the trading orders known to open market platforms;
send from trading computer(s) that store the trading orders to one or more query-receiving ones of the trading computer(s) queries seeking matches for trading orders stored at the query-sending trading computer(s), the queries including the specified instrument, and at least one of a specified quantity and a specified price;
at the query-receiving trading computer(s), attempt to match received queries against trading orders stored at the respective query-receiving trading computer while keeping trading orders and queries confidential from trading entities other than the entities that entered the respective trading orders, and inform a trading entity of a received query only when a match is detected between one of the trading entity's orders and a received query, the informing being to obtain approval of the trading entity to trade between the matched trading order and the matched received inquiry; and
facilitate execution of a trade between the trading entity associated with the trading order underlying the query matched by the query-receiving trading computer and the trading entity associated with the matching trading order.

35. The computer-readable, nontransitory media of claim 34:
wherein the one or more trading computers are trading computers under control of and secure to respective trading entities;
and the programs being further programmed to store the trading orders on the trading computers of the respective entities from whom the orders are received without making the trading orders known to open market platforms.

36. The computer-readable, nontransitory media of claim 34, wherein the trading orders are received from the trading entities into an order management system.

37. The computer-readable, nontransitory media of claim 34, being further programmed to cause the computer to:
bind a trading entity to a trade by obtaining approval of the trading entity of the query.

38. The computer-readable, nontransitory media of claim 34, wherein the query further includes information sufficient to determine a price for the trade, and wherein the positive response further indicates an intent to be bound to trade at the determined price.

39. The computer-readable, nontransitory media of claim 38, wherein the determined price is a specified price.

40. The computer-readable, nontransitory media of claim 34, wherein the query requests trading execution at a default price.

41. The computer-readable, nontransitory media of claim 40, wherein the default price is a market price for the specified instrument.

42. The computer-readable, nontransitory media of claim 40, wherein the default price is a market midpoint price for the specified instrument.

43. The computer-readable, nontransitory media of claim 34, being further programmed to:
send the queries from a central server.

44. The computer-readable, nontransitory media of claim 34, being further programmed to:
send the queries from trading computer(s) associated with the respective trading entities.

45. The computer-readable, nontransitory media of claim 34, being further programmed to:
obtain approval by obtaining approval from a human trader.

46. The computer-readable, nontransitory media of claim 34, wherein the programs are further programmed to cause one or more computer(s) to:

send queries relating to respective orders to query-receiving trading computer(s) based on selection criteria specified by the trading entity that entered the respective trading orders.

47. The computer-readable, nontransitory media of claim 46, wherein:
the selection criteria include trading history of trading entities to receive the queries.

48. The computer-readable, nontransitory media of claim 47, wherein:
the trading history of the selection criteria include a minimum positive response rate for the specified instrument to be met by the recipient trading entity before the respective query is sent to that recipient trading entity.

49. The computer-readable, nontransitory media of claim 47, wherein:
the trading history of the selection criteria include a minimum positive response rate for a specified set of instruments to be met by the recipient trading entity before the respective query is sent to that recipient trading entity.

50. The computer-readable, nontransitory media of claim 49, wherein:
the set of instruments is specified by relation to a particular entity.

51. The computer-readable, nontransitory media of claim 49, wherein:
the set of instruments is specified by relation to entities having a particular market capitalization.

52. The computer-readable, nontransitory media of claim 49, wherein:
the set of instruments specified by a trading order includes an set of instruments enumerated by the entity that entered the trading order.

53. The computer-readable, nontransitory media of claim 49, wherein:
the set of instruments includes any instrument characterized by a parameter specified by the entity that entered the trading order.

54. The computer-readable, nontransitory media of claim 49, wherein:
the set of instruments includes the specified instrument and an instrument substitutable for the specified instrument.

55. The computer-readable, nontransitory media of claim 34, the programs being further programmed to cause one or more computer(s) to:
inform a trading entity of a received query but withhold the full size of the query.

56. The computer-readable, nontransitory media of claim 34, the programs being further programmed to cause one or more computer(s) to:
after executing a partial fill of one of the trading orders, send further queries seeking further matches for trading orders to complete the trading order.

57. The computer-readable, nontransitory media of claim 34, the programs being further programmed to cause one or more computer(s) to:
prioritize trading orders and/or queries by quantity.

58. The computer-readable, nontransitory media of claim 34, wherein:
the positive response to the query includes the specified quantity.

59. The computer-readable, nontransitory media of claim 34, wherein:
the trade order further includes information sufficient to determine a price for the trade, and wherein facilitating execution further comprises facilitating execution of the trade between the first trader and the second trader for a specified quantity of the specified instrument at the determined price.

60. The computer-readable, nontransitory media of claim 59, wherein the determined price is a price specified by the entity that entered the trading order.

61. The computer-readable, nontransitory media of claim 34, the programs being further programmed to cause the computer to:
send notification of execution to trading entities other than those whose trading orders matched for the trade.

62. A computer of an electronic trading system, comprising:
query-sending trading computer(s) designed to:
store trading orders from trading entities, the trading orders each including a specified instrument, and at least one of a specified quantity and a specified price, and to store the trading orders without making the trading orders known to open market platforms,
send to one or more query-receiving ones of the trading computer(s) queries seeking matches for trading orders stored at the query-sending trading computer(s), the queries including the specified instrument, and at least one of a specified quantity and a specified price;
the query-receiving trading computer(s) being programmed to attempt to match received queries against trading orders stored at the respective query-receiving trading computer while keeping trading orders and queries confidential from trading entities other than the entities that entered the respective trading orders, and to inform a trading entity of a received query only when a match is detected between one of the trading entity's orders and a received query, the informing being to obtain approval of the trading entity to trade between the matched trading order and the matched received inquiry; and
at least one computer programmed to facilitate execution of a trade between the trading entity associated with the trading order underlying the query matched by the query-receiving trading computer and the trading entity associated with the matching trading order.

63. The system of claim 62, being further programmed to cause at least one computer to:
bind a trading entity to a trade by obtaining approval of the trading entity of the query.

64. The system of claim 62, wherein:
the query further includes information sufficient to determine a price for the trade, and
the positive response further indicates an intent to be bound to trade at the determined price.

65. The system of claim 64, wherein the determined price is a price specified by the entity that entered the trading order.

66. The system of claim 62, wherein the query requests trading execution at a default price.

67. The system of claim 66, wherein the default price is a market price for the specified instrument.

68. The system of claim 66, wherein the default price is a market midpoint price for the specified instrument.

69. The system of claim 62, being further programmed to:
obtain approval by obtaining approval from a human trader.

70. The system of claim 62, being further programmed to:
send queries relating to respective orders to query-receiving trading computer(s) based on selection criteria specified by the trading entity that entered the respective trading orders.

71. The system of claim 70, wherein:
the selection criteria include trading history of trading entities to receive the queries.

72. The system of claim 71, wherein:
the trading history of the selection criteria include a minimum positive response rate for the specified instrument to be met by the recipient trading entity before the respective query is to be sent to that recipient trading entity.

73. The system of claim 71, wherein:
the trading history of the selection criteria include a minimum positive response rate for a specified set of instruments to be met by the recipient trading entity before the respective query is to be sent to that recipient trading entity.

74. The system of claim 73, wherein:
the set of instruments is specified by relation to a particular entity.

75. The system of claim 73, being further programmed to cause at least one computer to:
accept a specification of the set of instruments by relation to entities having a particular market capitalization.

76. The system of claim 73, being further programmed to cause at least one computer to
accept a specification of the set of instruments for a trading order as enumeration by the entity that entered the trading order.

77. The system of claim 73, wherein the set of instruments includes any instrument characterized by a parameter specified by the entity that entered the trading order.

78. The system of claim 73, wherein the set of instruments includes the specified instrument and an instrument substitutable for the specified instrument.

79. The system of claim 62, being further programmed to:
inform a trading entity of a received query but withhold the full size of the query.

80. The system of claim 62, being further programmed to cause at least one computer to:
after executing a partial fill of one of the trading orders, send further queries seeking further matches for trading orders to complete the trading order.

81. The system of claim 62, being further programmed to cause at least one computer to:
prioritize trading orders and/or queries by quantity.

82. The system of claim 62, wherein:
the positive response to the query includes the specified quantity.

83. The system of claim 62, wherein:
wherein the trade order further includes information sufficient to determine a price for the trade, and
being further programmed to cause at least one computer to facilitate execution of the trade between the first trader and the second trader for a specified quantity of the specified instrument at the determined price.

84. The system of claim 62, being further programmed to cause at least one computer to:
send notification of execution to trading entities other than those whose trading orders matched for the trade.

* * * * *